United States Patent
Wei et al.

(10) Patent No.: US 10,771,581 B2
(45) Date of Patent: Sep. 8, 2020

(54) SYSTEMS AND METHODS FOR HANDLING A COOKIE FROM A SERVER BY AN INTERMEDIARY BETWEEN THE SERVER AND A CLIENT

(71) Applicant: Yottaa Inc., Boston, MA (US)

(72) Inventors: Coach K. Wei, Natick, MA (US); Robert Buffone, Wakefield, MA (US)

(73) Assignee: Yottaa Inc., Waltham, MA (US)

( * ) Notice: Subject to any disclaimer, the term of this patent is extended or adjusted under 35 U.S.C. 154(b) by 685 days.

(21) Appl. No.: 14/488,536

(22) Filed: Sep. 17, 2014

(65) Prior Publication Data

US 2015/0088975 A1 Mar. 26, 2015

Related U.S. Application Data

(60) Provisional application No. 61/880,347, filed on Sep. 20, 2013.

(51) Int. Cl.
| | |
|---|---|
| *H04L 29/08* | (2006.01) |
| *H04L 29/06* | (2006.01) |
| *G06F 9/46* | (2006.01) |
| *G06F 9/54* | (2006.01) |

(Continued)

(52) U.S. Cl.
CPC ............ *H04L 67/2823* (2013.01); *G06F 9/46* (2013.01); *G06F 9/54* (2013.01); *G06F 16/00* (2019.01); *G06F 40/14* (2020.01); *H04L 67/02* (2013.01); *H04L 67/10* (2013.01); *H04L 67/2804* (2013.01); *H04L 67/2819* (2013.01);

(Continued)

(58) Field of Classification Search
CPC ............................. G06F 9/46; G06F 17/2247

USPC ......................................................... 709/203
See application file for complete search history.

(56) References Cited

U.S. PATENT DOCUMENTS

| | | |
|---|---|---|
| 6,618,751 B1 | 9/2003 | Challenger et al. |
| 7,266,595 B1 | 9/2007 | Black et al. |
| 7,320,028 B2 | 1/2008 | Dinovo |

(Continued)

FOREIGN PATENT DOCUMENTS

EP  1 918 826 B1  2/2012

OTHER PUBLICATIONS

Alli et al., Automatic Page Scrolling for Mobile Web Search, IEEE 2014, pp. 175-182.

(Continued)

*Primary Examiner* — Tonia L Dollinger
*Assistant Examiner* — Joseph M Cousins
(74) *Attorney, Agent, or Firm* — Foley & Lardner LLP

(57) ABSTRACT

This disclosure is directed to methods and systems for handling a cookie by an intermediary between a server and a client. An intermediary may receive a first request from a client for a web page of a server, and may incorporate code into a first fragment of the web page to include in a modified web page for presentation at the client. The code, upon execution, may transmit a predefined request from the client. The intermediary may receive a response from the server to the first request. The response may include a cookie and information about the cookie in a header section of the response. The intermediary may transmit to the client responsive to the predefined request, the cookie and a second fragment for inclusion in the modified web page. The second fragment may include the information about the cookie in a header section of the second fragment.

14 Claims, 14 Drawing Sheets

| | |
|---|---|
| Receiving, by an intermediary between a client and a server, a first request from the client for a web page of the server. | Step 301 |
| Incorporating, by the intermediary, code into a first fragment of the web page to include in a modified web page for presentation at the client, the code, upon execution as the first fragment is presented to a user of the client, transmits a predefined request from the client. | Step 303 |
| Receiving, by the intermediary, a response from the server to the first request, the response comprising a cookie and information about the cookie in a header section of the response. | Step 305 |
| Transmitting, by the intermediary to the client responsive to the predefined request, the cookie and a second fragment for inclusion in the modified web page, the second fragment including the information about the cookie in a header section of the second fragment. | Step 307 |

(51) Int. Cl.
    *G06F 40/14*        (2020.01)
    *G06F 16/00*        (2019.01)
(52) U.S. Cl.
    CPC ............. *H04L 67/34* (2013.01); *H04L 67/42*
        (2013.01); *G06F 2209/541* (2013.01); *G06F 2209/542* (2013.01)

(56) References Cited

U.S. PATENT DOCUMENTS

| | | | |
|---|---|---|---|
| 7,398,304 | B2 | 7/2008 | Smith et al. |
| 7,613,723 | B2 | 11/2009 | Tully |
| 7,657,595 | B2 | 2/2010 | Agarwalla et al. |
| 7,711,854 | B2 | 5/2010 | Ecklund et al. |
| 7,770,130 | B1 | 8/2010 | Kaptelinin |
| 7,774,331 | B2 | 8/2010 | Barth et al. |
| 7,797,376 | B1 | 9/2010 | Desai |
| 7,823,057 | B1 | 10/2010 | Schultz et al. |
| 7,849,403 | B2 | 12/2010 | Joshi et al. |
| 7,895,523 | B2 | 2/2011 | Stockton |
| 7,930,285 | B2 | 4/2011 | Abraham et al. |
| 7,987,243 | B2 | 7/2011 | Stavrakos et al. |
| 8,001,175 | B2 | 8/2011 | Betancourt et al. |
| 8,522,131 | B1 | 8/2013 | Geddes |
| 8,639,753 | B1 | 1/2014 | Meadows |
| 8,694,520 | B1 | 4/2014 | Krishnakumar et al. |
| 8,701,000 | B2 | 4/2014 | Kroeger et al. |
| 8,850,070 | B2 | 9/2014 | Raghu et al. |
| 9,282,145 | B2 | 3/2016 | Wei et al. |
| 9,870,349 | B2 | 1/2018 | Wei et al. |
| 9,953,007 | B2 | 4/2018 | Oyarzabal et al. |
| 2002/0035642 | A1 | 3/2002 | Clarke et al. |
| 2002/0133627 | A1 | 9/2002 | Maes et al. |
| 2003/0174841 | A1 | 9/2003 | Nault et al. |
| 2003/0188016 | A1 | 10/2003 | Agarwalla et al. |
| 2004/0049574 | A1 | 3/2004 | Watson et al. |
| 2004/0064481 | A1 | 4/2004 | Azami |
| 2004/0064497 | A1 | 4/2004 | Debey |
| 2004/0101873 | A1 | 5/2004 | Went |
| 2004/0162886 | A1 | 8/2004 | Ims et al. |
| 2005/0071745 | A1 | 3/2005 | Enrich et al. |
| 2005/0152355 | A1 | 7/2005 | Henriques |
| 2005/0210243 | A1 | 9/2005 | Archard et al. |
| 2006/0015512 | A1 | 1/2006 | Alon et al. |
| 2006/0225065 | A1 | 10/2006 | Chandhok et al. |
| 2008/0016240 | A1 | 1/2008 | Balandin |
| 2008/0077809 | A1 | 3/2008 | Hayler et al. |
| 2008/0104269 | A1 | 5/2008 | Vitanov et al. |
| 2008/0120538 | A1 | 5/2008 | Kurz et al. |
| 2008/0126479 | A1 | 5/2008 | Zhang et al. |
| 2008/0148145 | A1 | 6/2008 | Jacob et al. |
| 2009/0063966 | A1 | 3/2009 | Ennals |
| 2009/0083538 | A1 | 3/2009 | Merugu et al. |
| 2009/0106255 | A1 | 4/2009 | Lacapra et al. |
| 2009/0106349 | A1* | 4/2009 | Harris ................. H04L 67/02 709/203 |
| 2009/0119504 | A1 | 5/2009 | Van Os et al. |
| 2009/0234972 | A1 | 9/2009 | Raghu et al. |
| 2009/0281989 | A1 | 11/2009 | Shukla et al. |
| 2009/0307622 | A1 | 12/2009 | Jalon et al. |
| 2010/0002013 | A1 | 1/2010 | Kagaya |
| 2010/0005169 | A1 | 1/2010 | Von Hilgers |
| 2010/0131585 | A1 | 5/2010 | Rodrigue et al. |
| 2010/0278453 | A1 | 11/2010 | King |
| 2011/0126248 | A1 | 5/2011 | Fisher et al. |
| 2011/0145321 | A1* | 6/2011 | Jiang ................. G06F 17/30902 709/203 |
| 2012/0096129 | A1* | 4/2012 | Green ................. G06F 16/972 709/219 |
| 2012/0110450 | A1 | 5/2012 | Kureshy et al. |
| 2012/0137210 | A1 | 5/2012 | Dillon |
| 2012/0174121 | A1 | 7/2012 | Treat et al. |
| 2012/0194519 | A1 | 8/2012 | Bissell et al. |
| 2012/0198050 | A1 | 8/2012 | Maki et al. |
| 2012/0203873 | A1 | 8/2012 | Lewin et al. |
| 2012/0271960 | A1 | 10/2012 | Geetha et al. |
| 2012/0303697 | A1* | 11/2012 | Alstad ............... G06F 17/30902 709/203 |
| 2013/0039419 | A1 | 2/2013 | Denoual et al. |
| 2013/0097522 | A1 | 4/2013 | Devries |
| 2013/0111325 | A1 | 5/2013 | Yue et al. |
| 2013/0117238 | A1 | 5/2013 | Gower |
| 2013/0124683 | A1 | 5/2013 | Watanabe et al. |
| 2013/0174000 | A1 | 7/2013 | Bernstein et al. |
| 2013/0185164 | A1 | 7/2013 | Pottjegort |
| 2013/0227004 | A1 | 8/2013 | Scoda |
| 2013/0250761 | A1 | 9/2013 | Shatzkamer et al. |
| 2013/0332253 | A1 | 12/2013 | Shiffert et al. |
| 2014/0026187 | A1* | 1/2014 | Johnson ................. G06F 21/53 726/3 |
| 2014/0059420 | A1 | 2/2014 | Cole et al. |
| 2014/0074588 | A1 | 3/2014 | Bertsch et al. |
| 2014/0096023 | A1 | 4/2014 | Falkenberg et al. |
| 2014/0136971 | A1 | 5/2014 | Kumar et al. |
| 2014/0244406 | A1* | 8/2014 | Garcia-Martinez ......................... G06Q 30/0277 705/14.73 |
| 2014/0298298 | A1 | 10/2014 | Cook et al. |
| 2015/0032803 | A1* | 1/2015 | Graham-Cumming ...................... H04L 29/06047 709/203 |
| 2015/0046789 | A1 | 2/2015 | Wei et al. |

OTHER PUBLICATIONS

Cardellini et al., Collaborative Proxy System for Distributed Web Content Transcoding, ACM 2000, pp. 520-527.
International Preliminary Report on Patentability on PCT/US2014/012962 dated Mar. 31, 2016.
International Search Report & Written Opinion on PCT/US2014/012962 dated Jun. 27, 2014.
Kiciman et al., AjaxScope: A Platform for Remotely Monitoring the Client-Side Behavior of Web 2.0 Applications, ACM 2010, pp. 1-52.
Notice of Allowance on U.S. Appl. No. 14/163,642 dated Oct. 22, 2015.
Office Action on U.S. Appl. No. 14/163,627 dated Apr. 8, 2016.
Office Action on U.S. Appl. No. 14/163,627 dated Jan. 29, 2015.
Office Action on U.S. Appl. No. 14/163,627 dated Oct. 4, 2016.
Office Action on U.S. Appl. No. 14/163,627 dated Oct. 8, 2015.
Office Action on U.S. Appl. No. 14/163,627 dated Mar. 23, 2017.
Office Action on U.S. Appl. No. 14/163,627 dated Jun. 18, 2015.
Office Action on U.S. Appl. No. 14/163,627 dated Jul. 3, 2014.
Office Action on U.S. Appl. No. 14/163,642 dated Feb. 13, 2015.
Office Action on U.S. Appl. No. 14/163,642 dated Aug. 11, 2014.
Office Action on U.S. Appl. No. 14/163,645 dated Jan. 4, 2016.
Office Action on U.S. Appl. No. 14/163,645 dated Dec. 12, 2014.
Office Action on U.S. Appl. No. 14/163,645 dated Apr. 1, 2015.
Office Action on U.S. Appl. No. 14/163,645 dated May 20, 2014.
Office Action on U.S. Appl. No. 14/163,645 dated Jul. 29, 2015.
Paterno et al., Automatically Adapting Web Sites for Mobile Access through Logical Description and Dynamic Analysis of Interaction Resources, ACM 2008, pp. 260-267.
Thompson et al., Intermediary Architecture: Interposing Middleware Object Services between Web Client and Server, ACM 1999, pp. 1-5.
Vasudevan et al., On Web Annotations: Promises and Pitfalls of Current Web Infrastructure, IEEE 1999, pp. 1-9.
Witt et al., Reducing Cognitive Overhead on the World Wide Web, Google 2001, pp. 311-320.
Final Office Action on U.S. Appl. No. 14/488,536 dated Sep. 6, 2019.
Final Office Action on U.S. Appl. No. 14/488,536 dated Jan. 5, 2018.
Final Office Action on U.S. Appl. No. 15/061,711 dated May 18, 2018.
Final Office Action on U.S. Appl. No. 15/802,025 dated Mar. 21, 2019.

(56) References Cited

OTHER PUBLICATIONS

Final Office Action on U.S. Appl. No. 15/808,671 dated Jun. 13, 2019.
Non-Final Office Action on U.S. Appl. No. 14/488,536 dated Oct. 2, 2018.
Non-Final Office Action on U.S. Appl. No. 15/802,025 dated Jun. 15, 2018.
Non-Final Office Action on U.S. Appl. No. 15/802,025 dated Sep. 6, 2019.
Non-Final Office Action on U.S. Appl. No. 15/808,671 dated Oct. 15, 2018.
Notice of Allowance on U.S. Appl. No. 15/061,711 dated Jun. 13, 2019.
Notice of Allowance on U.S. Appl. No. 15/061,711 dated Jul. 25, 2019.
Notice of Allowance on U.S. Appl. No. 15/061,711 dated Aug. 16, 2019.
U.S. Notice of Allowance on U.S. Appl. No. 14/163,627 dated Sep. 8, 2017.
U.S. Notice of Allowance on U.S. Appl. No. 14/163,627 dated Sep. 27, 2017.
U.S. Office Action on U.S. Appl. No. 15/061,711 dated Aug. 28, 2017.
Non-Final Office Action on U.S. Appl. No. 15/808,671 dated Jun. 12, 2020.

\* cited by examiner

```
▽ <table cellpadding="0" cellspacing="0" border="0"
    class="dataList12 wt11" width="100%">
  ▽ <tbody>
    ▽ <tr>
      ▽ <td align="center" valign="middle" width=
          "255">
        ▽ <span class="itemImg">
          ▽ <a href="/p/Apple-iMac/
              product~dpno~9425077~pdp.iaebhai" title=
              "apple imac">
              ┌─────────────────────────────────────┐
              │ <img src="//i2.cc-inc.com/prod/     │
              │ 942500/9425077_lg.jpg" alt="apple   │
              │ Imac" style="font-size:1px; line-   │
              │ height:50%;width:200px;" border="0" │
              │ width="200" height="200">.          │
              └─────────────────────────────────────┘
            </a>
          </span>
        </td>
      </tr>
    △ </tr>...</tr>
```

*Fig. 2E*

| !!! | Optimizer | Traffic Controller | Site Monitor | Site Monitor | DNS | Dashboard | Issues(3) | Manage | user@co.com |

Yottaa  www.yottaa.com ▽   Change mode ▽   Private Test | Flush Cache   Add

General  ☐ Mobile  Searching Engine  +Add target

Target Overview

Yottaa Optimizer is live for this site – live on  F1a31ac0a6fb012fa4e2123d0570ba.yottaa.net
07/03/2012 at 05:14AM UTC  -What's this?

Automation Settings

Tag Accelerator iframe
Tags: | iframe | image | script | video | object |
Remove from list    Discover Tag

| New | Edit | Optimize | Transform |

| ☐ | Name | Tag Type | Status | Comment |
|---|---|---|---|---|
| ☐ | facebook1 | iframe | optimized | Mode it load on-demand |
| ☐ | twitter | iframe | Transformed by transformerName | configured a transformer for this tag by Coach June 27 2013 |
| ☐ | pinterest | script | Up-optimized | |

Yottaa | Optimizer | Traffic Controller | Site Monitor | Site Monitor | DNS | Dashboard | Issues(3) | Manage | user@co.com www.yot... >>Optimize this tag    Ok   Cancel   X   ache Edit Tag General  Mo Tag name: facebook1

Target Overview

Tag type: iframe ▽

Automation Setting Code:
```
<iframe
src="//www.facebook.com
%2www.facebook.com
%2FFacebookDevelopers
e=lightamp;stream=trueamp...
Frameborder="0" style="border:none; overflow:hidden;
width:292px; height:590px;" allow
Transparency="true"></iframe>
```

Tag Accelerator   matches ▽
                   Script
                   Image
                   Video
                   Object iframe   contains 123d0570ba.yottaa.net Add Tag | Discover Tag    Add ☐ twitter     iframe        Transformed by transformerName    configured a transformer for
                                                                this tag by Coach June 27 2013
☐ pinterest   script        Up-optimized                       it load on-demand   Comment Optimize Tag "facebooks"

Optimization action: ☐ None  ☐ Removed (?)  ☑ On-demand load (?)  ☐ cloud processing (?)   <<Edit Tag   Ok   Cancel   X
                                  ☑ Conditional removal (?)  ☐ Deferred load (?)

Conditions: Remove tag if visitor geo-location is from [China ▽] (?)

on-demand load
◉ Load tag when DOM element whose [ID ▽] mathes [    ] is visible (?)
○ Load tag when DOM element whose [ID ▽] mathes [    ] fires event [mouseover ▽] (?)

Deferred load
◉ defer load tab by [4000] milliseconds (?)
○ defer load tab by [2000] milliseconds after document onload event (?)

Loading indicator:
○ show plain text     [Loading..] (?)
○ show icon from URL  [       ] (?)
◉ show blank GIF

*Fig. 2H*

SYSTEMS AND METHODS FOR HANDLING A COOKIE FROM A SERVER BY AN INTERMEDIARY BETWEEN THE SERVER AND A CLIENT

RELATED APPLICATIONS

This application claims priority to U.S. provisional application 61/880,347, filed Sep. 20, 2013, entitled "SYSTEMS AND METHODS FOR MANAGING LOADING PRIORITY OR SEQUENCING OF FRAGMENTS OF A WEB OBJECT", which is hereby incorporated by reference in its entirety for all purposes.

FIELD OF THE DISCLOSURE

This disclosure generally relates to systems and methods for facilitating web performance improvement. In particular, this disclosure relates to systems and methods for handling a cookie from a server by an intermediary between the server and a client.

BACKGROUND OF THE DISCLOSURE

Content delivery systems are typically used to improve the end-to-end performance of web content delivery between a server and a client. These systems may cache static web pages or other objects, and may serve these cached objects to requesting clients directly, thereby improving performance while reducing load and congestion on a content originator such as a server. However, a significant portion of typical web content may be dynamic in nature, and typical content delivery systems may not handle dynamic content efficiently. As such, server-side processing of a requested web object, as well as any accompanying cookies, can take a significant amount of time, while the web client may be waiting for the server to respond. This can significantly impair the web experience of a user.

BRIEF SUMMARY OF THE DISCLOSURE

Described herein are systems and methods for handling a cookie from a server by an intermediary between the server and a client. These may be implemented in conjunction with the modification of a requested web page at an intermediary. A cookie may comprise a tag, pixel and/or tracking code/data. The present systems and methods can provide real time intervention via a cloud service or at an intermediary, upon receiving a client's request to a server for a web object. The intermediary may manage content and/or resources (e.g., a cookie) delivered to the client while communicating with the server to process or fulfill the request. The intermediary may identify or define a plurality of HTML fragments that can be assembled into a modified web page for the client, in response to the request. The intermediary may provide a plurality of web object fragments that can be assembled into a web object to fulfill the request. Web objects can include an HTML page, a script (e.g., Javascript) file, an image, a video object, audio object, a flash file or small web format (SWF) file, or a CSS file, as examples. The intermediary may be configured to inject or incorporate code into a transmitted fragment. The code may be executed by the browser (e.g., in the background) as one or more fragments are loaded or rendered as part of the modified web page. In some embodiments, the code may be intelligently configured to perform certain actions that modify the web page or affect some aspect of a resource of the web page. The code, upon execution, may provide cookie management for enhanced web-based interactions.

In one aspect, the disclosure is directed to a method for handling a cookie from a server by an intermediary between the server and a client. The method may include receiving, by an intermediary between a client and a server, a first request from the client for a web page of the server. The intermediary may incorporate code into a first fragment of the web page to include in a modified web page for presentation at the client. The code, upon execution as the first fragment is presented to a user of the client, may transmit a predefined request from the client. The intermediary may receive a response from the server to the first request. The response may include a cookie and information about the cookie in a header section of the response. The intermediary may transmit to the client responsive to the predefined request, the cookie and a second fragment for inclusion in the modified web page. The second fragment may include the information about the cookie in a header section of the second fragment.

In some embodiments, the intermediary may determine that the server provides a HttpOnly cookie. The intermediary may determine that the server provides a HttpOnly cookie based on a prior communication from the server. The intermediary may incorporate code that, upon execution, requests a predefined resource from the server. The intermediary may incorporate code that, upon execution, transmits a request that is received or intercepted by the intermediary. The intermediary may receive or intercept the predefined request from the client. The intermediary may associate the cookie from the server with the predefined request. The intermediary may associate the predefined request with the server's response comprising the cookie information.

In certain embodiments, the intermediary may transmit the second fragment, the second fragment comprising a multipurpose internet mail extensions (MIME) multipart message. The intermediary may transmit the second fragment, the second fragment comprising a body section that is empty or having a one-pixel image.

In another aspect, the disclosure is directed to a system for handling a cookie from a server by an intermediary between the server and a client. The system may include code for executing on a client to transmit a predefined request from the client. An intermediary device between the client and a server, may receive a first request from the client for a web page of the server. The intermediary may incorporate the code into a first fragment of the web page to include in a modified web page for presentation at the client. The code, upon execution as the first fragment is presented to a user of the client, may transmit the predefined request. The intermediary device may receive a response from the server to the first request. The response may include a cookie and information about the cookie in a header section of the response. The intermediary may transmit, to the client responsive to the predefined request from the client, the cookie and a second fragment for inclusion in the modified web page. The second fragment may include the information about the cookie in a header section of the second fragment.

In some embodiments, the intermediary device determines that the server provides a HttpOnly cookie. The intermediary device may determine that the server provides a HttpOnly cookie based on a prior communication from the server. The intermediary device may incorporate code that, upon execution, requests a predefined resource from the server. The intermediary device may incorporate code that, upon execution, transmits a request that is received or intercepted by the intermediary. The intermediary device may receive or intercept the predefined request from the client.

In certain embodiments, the intermediary device associates the cookie from the server with the predefined request. The intermediary device may associate the predefined request with the server's response comprising the cookie information. The intermediary device may transmit the second fragment, the second fragment comprising a multipurpose internet mail extensions (MIME) multipart message. The intermediary device may transmit the second fragment, the second fragment comprising a body section that is empty or having a one-pixel image.

The details of various embodiments of the invention are set forth in the accompanying drawings and the description below.

BRIEF DESCRIPTION OF THE DRAWINGS

The foregoing and other objects, aspects, features, and advantages of the disclosure will become more apparent and better understood by referring to the following description taken in conjunction with the accompanying drawings, in which:

FIG. 2E includes one embodiment of a web page segment including a highlighted portion referencing an image or a resource;

FIGS. 2F-2H comprise embodiments of a user interface for configuring tag-based and other types of modifications to a requested web page;

Figure 1A:
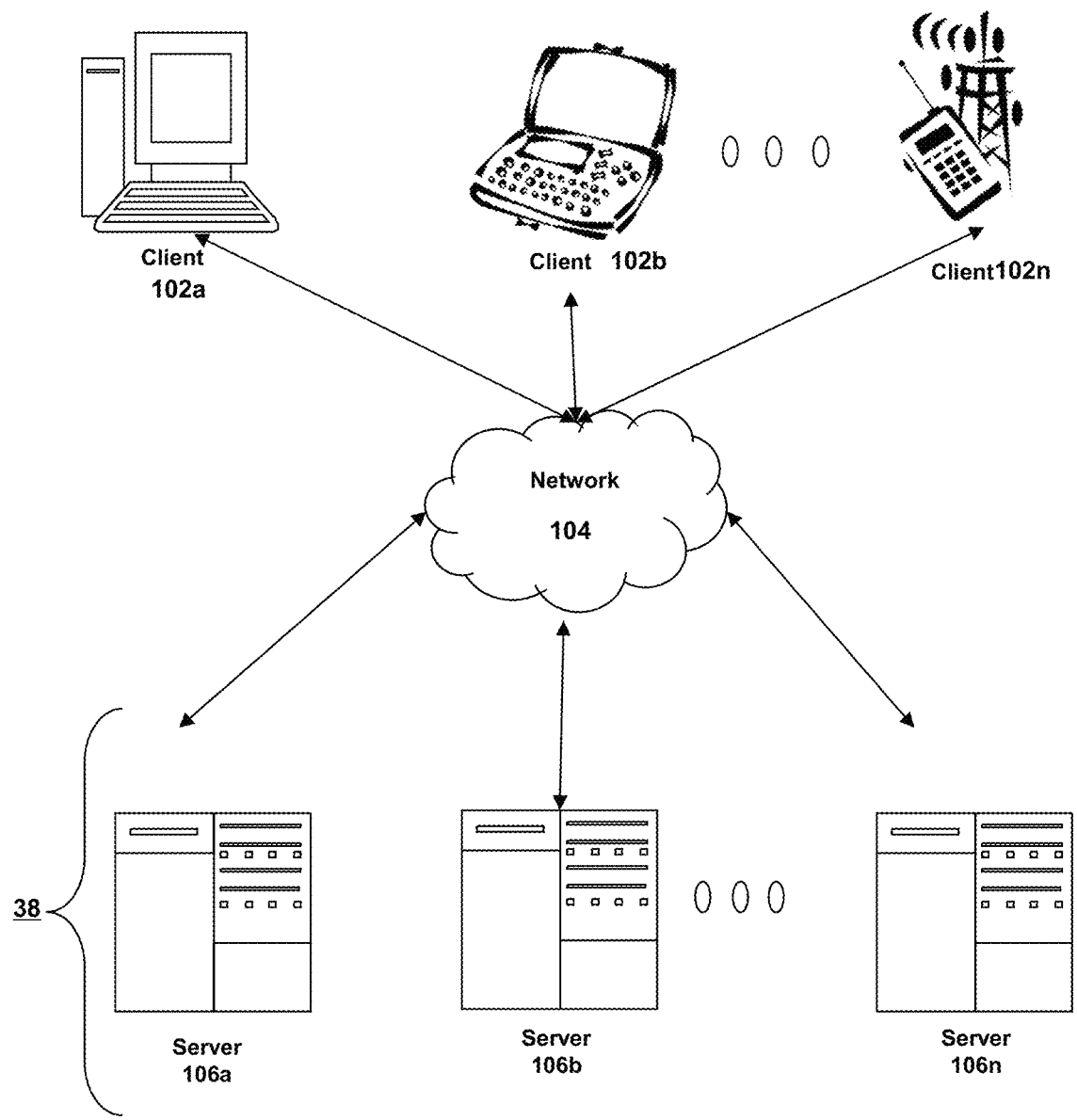
FIG. 1A is a block diagram depicting an embodiment of a network environment comprising client machines in communication with remote machines.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein;

Section B describes embodiments of systems and methods for dynamically modifying a requested web page from a server for presentation at a client;

Section C describes embodiments of systems and methods for dynamically managing loading priority or sequencing of fragments of a web object; and Section D describes embodiments of systems and methods for handling a cookie from a server by an intermediary between the server and a client.

A. Computing and Network Environment

Prior to discussing specific embodiments of the present solution, it may be helpful to describe aspects of the operating environment as well as associated system components (e.g., hardware elements) in connection with the methods and systems described herein. Referring to FIG. 1A, an embodiment of a network environment is depicted. In brief overview, the network environment includes one or more clients 101a-101n (also generally referred to as local machine(s) 101, client(s) 101, client node(s) 101, client machine(s) 101, client computer(s) 101, client device(s) 101, endpoint(s) 101, or endpoint node(s) 101) in communication with one or more servers 106a-106n (also generally referred to as server(s) 106, node 106, or remote machine(s) 106) via one or more networks 104. In some embodiments, a client 101 has the capacity to function as both a client node seeking access to resources provided by a server and as a server providing access to hosted resources for other clients 101a-101n.

Although FIG. 1A shows a network 104 between the clients 101 and the servers 106, the clients 101 and the servers 106 may be on the same network 104. The network 104 can be a local-area network (LAN), such as a company Intranet, a metropolitan area network (MAN), or a wide area network (WAN), such as the Internet or the World Wide Web. In some embodiments, there are multiple networks 104 between the clients 101 and the servers 106. In one of these embodiments, a network 104' (not shown) may be a private network and a network 104 may be a public network. In another of these embodiments, a network 104 may be a private network and a network 104' a public network. In still another of these embodiments, networks 104 and 104' may both be private networks.

The network 104 may be any type and/or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 may be a bus, star, or ring network topology. The network 104 may be of any such network topology as known to those ordinarily skilled in the art capable of supporting the operations described herein. The network may comprise mobile telephone networks utilizing any protocol(s) or standard(s) used to communicate among mobile devices, including AMPS, TDMA, CDMA, GSM, GPRS, UMTS, WiMAX, 3G or 4G. In some embodiments, different types of data may be transmitted via different protocols. In other embodiments, the same types of data may be transmitted via different protocols.

In some embodiments, the system may include multiple, logically-grouped servers 106. In one of these embodiments, the logical group of servers may be referred to as a server farm 38 or a machine farm 38. In another of these embodiments, the servers 106 may be geographically dispersed. In other embodiments, a machine farm 38 may be administered as a single entity. In still other embodiments, the machine farm 38 includes a plurality of machine farms 38. The servers 106 within each machine farm 38 can be heterogeneous—one or more of the servers 106 or machines 106 can operate according to one type of operating system platform (e.g., WINDOWS, manufactured by Microsoft Corp. of Redmond, Wash.), while one or more of the other servers 106 can operate on according to another type of operating system platform (e.g., Unix or Linux).

In one embodiment, servers 106 in the machine farm 38 may be stored in high-density rack systems, along with associated storage systems, and located in an enterprise data center. In this embodiment, consolidating the servers 106 in this way may improve system manageability, data security, the physical security of the system, and system performance by locating servers 106 and high performance storage systems on localized high performance networks. Centralizing the servers 106 and storage systems and coupling them with advanced system management tools allows more efficient use of server resources.

The servers 106 of each machine farm 38 do not need to be physically proximate to another server 106 in the same machine farm 38. Thus, the group of servers 106 logically grouped as a machine farm 38 may be interconnected using a wide-area network (WAN) connection or a metropolitan-area network (MAN) connection. For example, a machine farm 38 may include servers 106 physically located in different continents or different regions of a continent, country, state, city, campus, or room. Data transmission speeds between servers 106 in the machine farm 38 can be increased if the servers 106 are connected using a local-area network (LAN) connection or some form of direct connection. Additionally, a heterogeneous machine farm 38 may include one or more servers 106 operating according to a type of operating system, while one or more other servers 106 execute one or more types of hypervisors rather than operating systems. In these embodiments, hypervisors may be used to emulate virtual hardware, partition physical hardware, virtualize physical hardware, and execute virtual machines that provide access to computing environments. Hypervisors may include those manufactured by VMWare, Inc., of Palo Alto, Calif.; the Xen hypervisor, an open source product whose development is overseen by Citrix Systems, Inc.; the VirtualServer or virtual PC hypervisors provided by Microsoft or others.

In order to manage a machine farm 38, at least one aspect of the performance of servers 106 in the machine farm 38 should be monitored. Typically, the load placed on each server 106 or the status of sessions running on each server 106 is monitored. In some embodiments, a centralized service may provide management for machine farm 38. The centralized service may gather and store information about a plurality of servers 106, respond to requests for access to resources hosted by servers 106, and enable the establishment of connections between client machines 101 and servers 106.

Management of the machine farm 38 may be de-centralized. For example, one or more servers 106 may comprise components, subsystems and modules to support one or more management services for the machine farm 38. In one of these embodiments, one or more servers 106 provide functionality for management of dynamic data, including techniques for handling failover, data replication, and increasing the robustness of the machine farm 38. Each server 106 may communicate with a persistent store and, in some embodiments, with a dynamic store.

Server 106 may be a file server, application server, web server, proxy server, appliance, network appliance, gateway, gateway, gateway server, virtualization server, deployment server, SSL VPN server, or firewall. In one embodiment, the server 106 may be referred to as a remote machine or a node. In another embodiment, a plurality of nodes 290 may be in the path between any two communicating servers.

In one embodiment, the server 106 provides the functionality of a web server. In another embodiment, the server 106a receives requests from the client 101, forwards the requests to a second server 206b and responds to the request by the client 101 with a response to the request from the server 106b. In still another embodiment, the server 106 acquires an enumeration of applications available to the client 101 and address information associated with a server 106' hosting an application identified by the enumeration of applications. In yet another embodiment, the server 106 presents the response to the request to the client 101 using a web interface. In one embodiment, the client 101 communicates directly with the server 106 to access the identified application. In another embodiment, the client 101 receives output data, such as display data, generated by an execution of the identified application on the server 106.

Figure 1B:
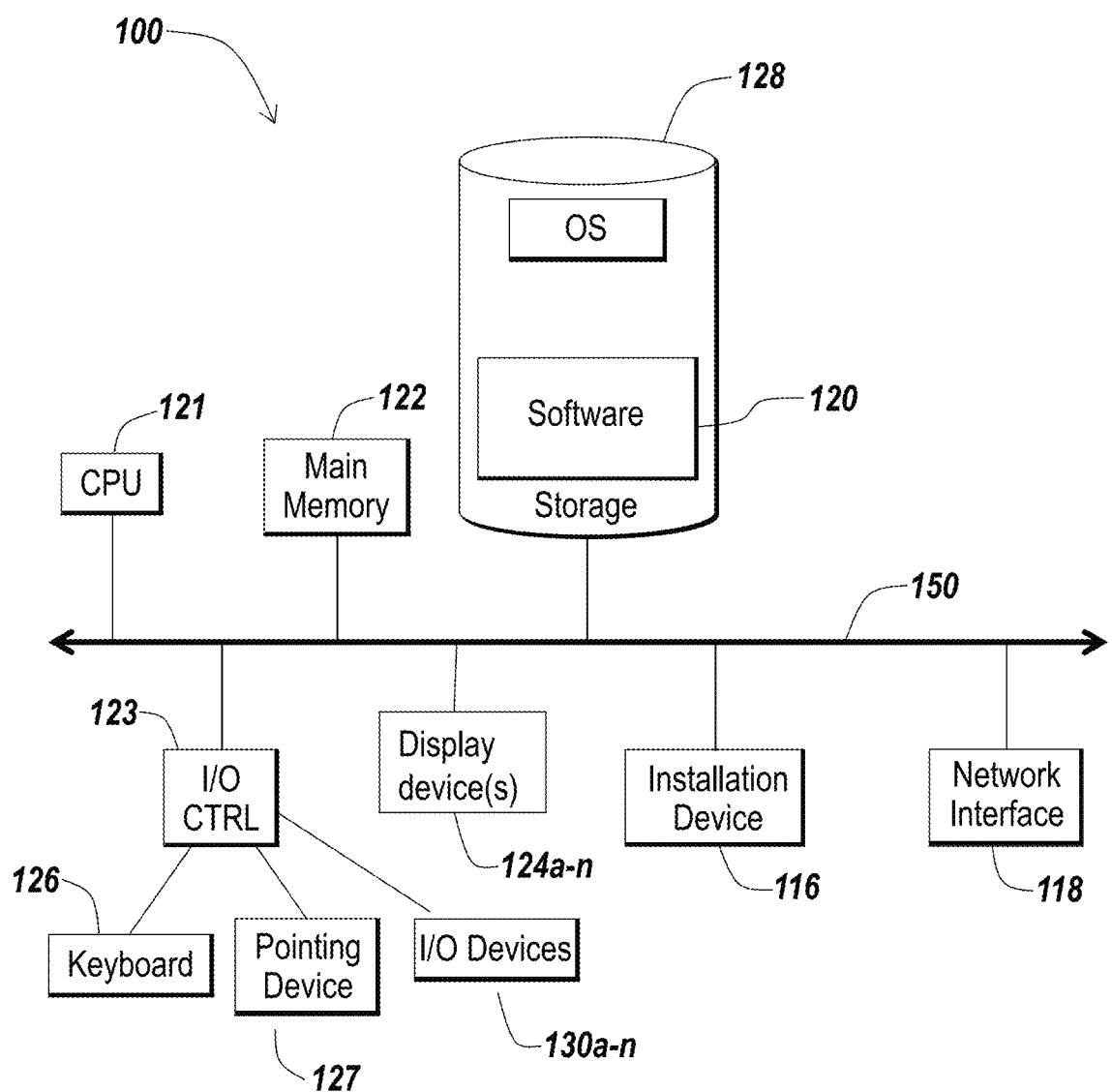
FIGS. 1B and 1C are block diagrams depicting embodiments of computing devices useful in connection with the methods and systems described herein.
Figure 1C:
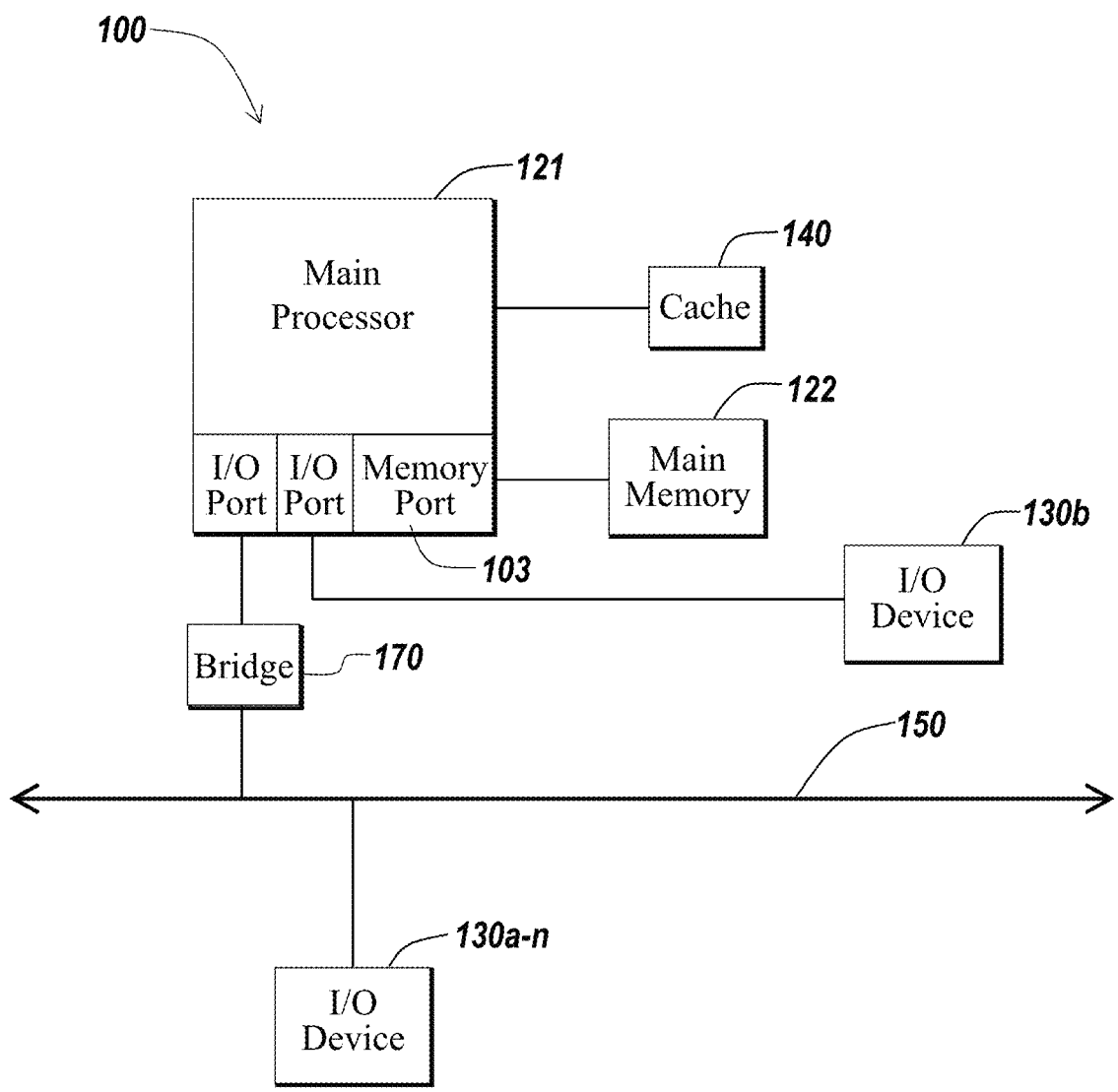

The client 101 and server 106 may be deployed as and/or executed on any type and form of computing device, such as a computer, network device or appliance capable of communicating on any type and form of network and performing the operations described herein. FIGS. 1B and 1C depict block diagrams of a computing device 100 useful for practicing an embodiment of the client 101 or a server 106. As shown in FIGS. 1B and 1C, each computing device 100 includes a central processing unit 121, and a main memory unit 122. As shown in FIG. 1B, a computing device 100 may include a storage device 128, an installation device 116, a network interface 118, an I/O controller 123, display devices 124a-101n, a keyboard 126 and a pointing device 127, such as a mouse. The storage device 128 may include, without limitation, an operating system and/or software. As shown in FIG. 1C, each computing device 100 may also include additional optional elements, such as a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, such as: those manufactured by Intel Corporation of Mountain View, Calif.; those manufactured by Motorola Corporation of Schaumburg, Ill.; those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 121, such as Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), Ferroelectric RAM (FRAM), NAND Flash, NOR Flash and Solid State Drives (SSD). The main memory 122 may be based on any of the above described memory chips, or any other available memory chips capable of operating as described herein. In the embodiment shown in FIG. 1B, the processor 121 communicates with main memory 122 via a system bus 150 (described in more detail below). FIG. 1C depicts an embodiment of a computing device 100 in which the processor communicates directly with main memory 122 via a memory port 103. For example, in FIG. 1C the main memory 122 may be DRDRAM.

FIG. 1C depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1C, the processor 121 communicates with various I/O devices 130 via a local system bus 150. Various buses may be used to connect the central processing unit 121 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 121 may use an Advanced Graphics Port (AGP) to communicate with the display 124. FIG. 1C depicts an embodiment of a computer 100 in which the main processor 121 may communicate directly with I/O device 130b, for example via HYPERTRANSPORT, RAPIDIO, or INFINIBAND communications technology. FIG. 1C also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices include keyboards, mice, trackpads, trackballs, microphones, dials, touch pads, and drawing tablets. Output devices include video displays, speakers, inkjet printers, laser printers, projectors and dye-sublimation printers. The I/O devices may be controlled by an I/O controller 123 as shown in FIG. 1B. The I/O controller may control one or more I/O devices such as a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices such as the USB Flash Drive line of devices manufactured by Twintech Industry, Inc. of Los Alamitos, Calif.

Referring again to FIG. 1B, the computing device 100 may support any suitable installation device 116, such as a disk drive, a CD-ROM drive, a CD-R/RW drive, a DVD-ROM drive, a flash memory drive, tape drives of various formats, USB device, hard-drive or any other device suitable for installing software and programs. The computing device 100 can further include a storage device, such as one or more hard disk drives or redundant arrays of independent disks, for storing an operating system and other related software, and for storing application software programs such as any program or software 120 for implementing (e.g., configured and/or designed for) the systems and methods described herein. Optionally, any of the installation devices 116 could also be used as the storage device. Additionally, the operating system and the software can be run from a bootable medium, for example, a bootable CD.

Furthermore, the computing device 100 may include a network interface 118 to interface to the network 104 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, CDMA, GSM, WiMax and direct asynchronous connections). In one embodiment, the computing device 100 communicates with other computing devices 100' via any type and/or form of gateway or tunneling protocol such as Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device 130 may be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a FibreChannel bus, a Serial Attached small computer system interface bus, or a HDMI bus.

A computing device 100 of the sort depicted in FIGS. 1B and 1C typically operates under the control of operating systems, which control scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: Android, manufactured by Google Inc; WINDOWS 7 and 8, manufactured by Microsoft Corporation of Redmond, Wash.; MAC OS, manufactured by Apple Computer of Cupertino, Calif.; WebOS, manufactured by Research In Motion (RIM); OS/2, manufactured by International Business Machines of Armonk, N.Y.; and Linux, a freely-available operating system distributed by Caldera Corp. of Salt Lake City, Utah, or any type and/or form of a Unix operating system, among others.

The computer system 100 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. The computer system 100 has sufficient processor power and memory capacity to perform the operations described herein. For example, the computer system 100 may comprise a device of the IPAD or IPOD family of devices manufactured by Apple Computer of Cupertino, Calif., a device of the PLAYSTATION family of devices manufactured by the Sony Corporation of Tokyo, Japan, a device of the NINTENDO/Wii family of devices manufactured by Nintendo Co., Ltd., of Kyoto, Japan, or an XBOX device manufactured by the Microsoft Corporation of Redmond, Wash.

In some embodiments, the computing device 100 may have different processors, operating systems, and input devices consistent with the device. For example, in one embodiment, the computing device 100 is a smart phone, mobile device, tablet or personal digital assistant. In still other embodiments, the computing device 100 is an Android-based mobile device, an iPhone smart phone manufactured by Apple Computer of Cupertino, Calif., or a Blackberry handheld or smart phone, such as the devices manufactured by Research In Motion Limited. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

In some embodiments, the computing device 100 is a digital audio player. In one of these embodiments, the computing device 100 is a tablet such as the Apple IPAD, or a digital audio player such as the Apple IPOD lines of devices, manufactured by Apple Computer of Cupertino, Calif. In another of these embodiments, the digital audio player may function as both a portable media player and as a mass storage device. In other embodiments, the computing device 100 is a digital audio player such as an MP3 players. In yet other embodiments, the computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the communications device 101 includes a combination of devices, such as a mobile phone combined with a digital audio player or portable media player. In one of these embodiments, the communications device 101 is a smartphone, for example, an iPhone manufactured by Apple Computer, or a Blackberry device, manufactured by Research In Motion Limited. In yet another embodiment, the communications device 101 is a laptop or desktop computer equipped with a web browser and a microphone and speaker system, such as a telephony headset. In these embodiments, the communications devices 101 are web-enabled and can receive and initiate phone calls.

In some embodiments, the status of one or more machines 101, 106 in the network 104 is monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Dynamically Modifying a Requested Web Page from a Server

Described herein are systems and methods for dynamically modifying a requested web page from a server at an intermediary for presentation at a client. The present systems and methods can provide real time intervention via a cloud service or at an intermediary, upon receiving a client's request for a web page of a server. The intermediary may manage content and/or resources delivered to the client while communicating with the server to process or fulfill the request. The intermediary may provide a plurality of HTML fragments that can be assembled into a modified web page for the client, in response to the request. The fragments may be delivered sequentially and in a controlled manner (e.g., as data is available at the intermediary and/or from the server), for processing by the client's browser and presented to the user. This can lead to improved or enhanced system performance (e.g., using caching methods) and/or user experience.

The intermediary may be configured to inject or incorporate code into a fragment for transmission to the client. The code may be executed by the browser (e.g., in the background) as the fragments are loaded or rendered as part of the modified web page. In some embodiments, the code may be intelligently configured to perform certain actions that modify the web page or affect some aspect of a resource of the web page. The web page may be modified to improve user experience. For example, the code may, upon execution, pre-fetch a resource for faster loading at a right moment, provide cookie management for enhanced web-based interactions, incorporate third-party resources to a web page, or alter certain characteristics of resources. A requested web page may therefore be modified dynamically at the intermediary and assembled at the client without affecting how the server generates its web pages. Code injected into the fragments can execute in the background as each fragment is loaded onto a browser, altering web page features without the user even realizing. The code-based processing produces an improved user experience, e.g., a richer experience with additional or custom content, an improved or more appropriate web page layout, or a more responsive loading or rendering of web page elements.

Figure 2A:
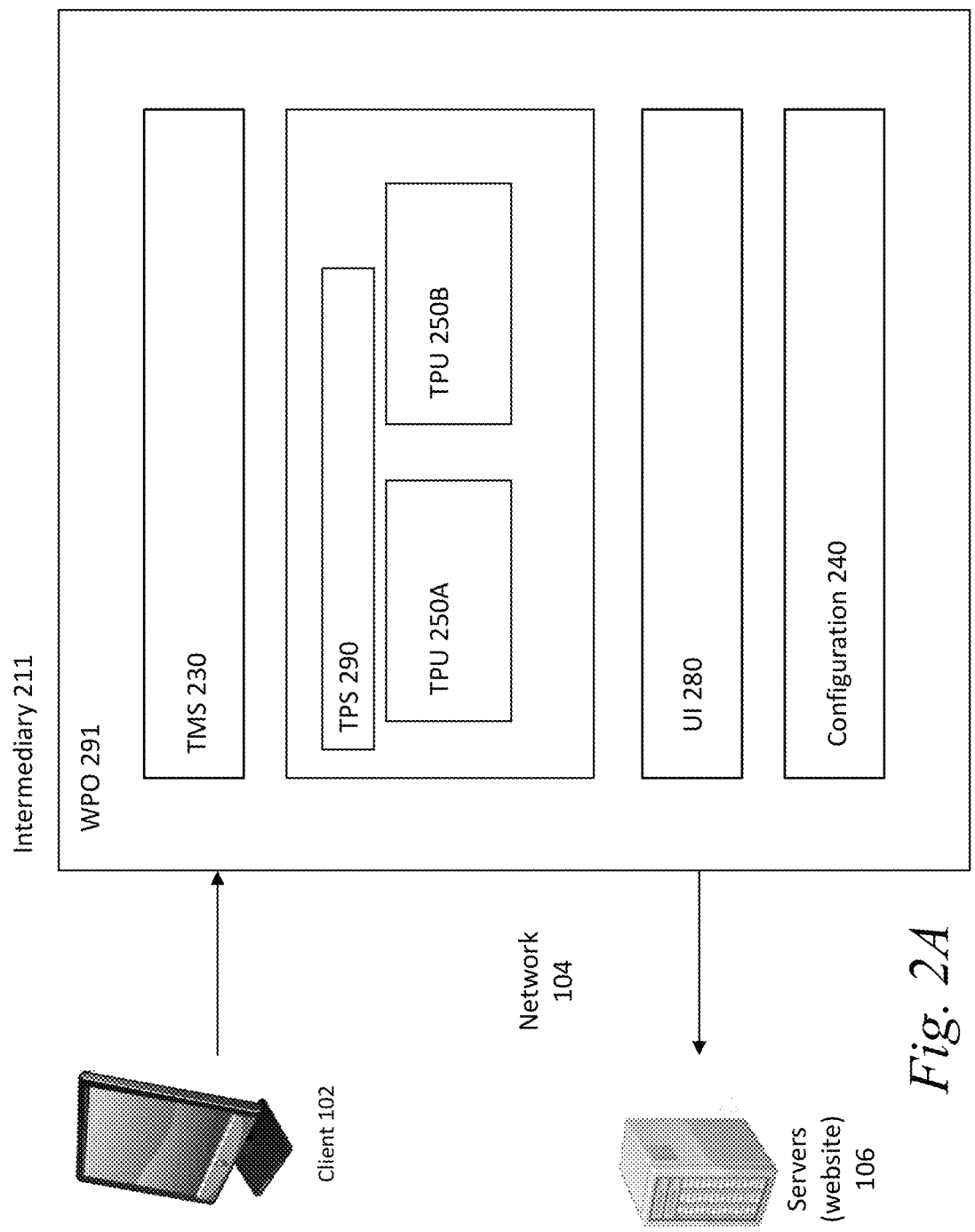
FIG. 2A is a block diagram depicting one embodiment of a system for dynamically modifying a requested web page from a server for presentation at a client.

Referring to FIG. 2A, one embodiment of a system for dynamically modifying a requested web page from a server for presentation at a client is depicted. In brief overview, the system may include an intermediary between at least one client device and at least one server. The intermediary may include a web performance optimization system (WPO) 291. The WPO may include a traffic processing system (TPS) 290, a traffic management system (TMS) 230 and a customizing user interface (UI) 280. The TPS 290 may include geographically-dispersed or cloud-based traffic processing units (TPU) 250. The TPS 290 may receive and process HTTP (or HTTPS) requests and responses between a client and a server or website, and the TMS may manage routing of client requests through the TPS. In the present disclosure, although HTTP may sometimes be referenced by way of example, HTTPS or an alternative scheme is contemplated and within the scope of this disclosure. A user or third party may use the customizing user interface and/or an application programming interface (API) to query, add, remove and adjust a setting, status or configuration of the WPO system to achieve desired results. When a client issues a HTTP request to a server or website, the HTTP request may be directed to pass through the intermediary. Upon receiving HTTP request (e.g., via the TMS), the TPS may analyze the HTTP request (e.g., determine the client type), select and apply context-specific optimization techniques to deliver appropriate fragments for assembly into a modified web page.

The intermediary may include a hardware device such as an appliance, network component, proxy, router, or any combination thereof. In instances where an intermediary device is referenced, the intermediary device may comprise any one or more of the above-mentioned components (e.g., TPS, TMS) within a single device or a collection of networked devices. Each of the components may embody hardware, or a combination of hardware and software (e.g., program code executing on hardware of the intermediary).

The WPO can deliver dynamic content from an originating server to one or more clients via partial object caching and client-side processing. An object may, for example, include a web page, and a partial object may include a fragment of a web page. Instead of connecting to the server directly, a client may communicate with the server via an intermediary device. The intermediary may store cached copies of content and other resources from the server. The cached copies may have been identified and extracted based on prior interactions with the server and/or client. When a client requests for an object such as a web page, the intermediary may return a partial object from its cache almost immediately, e.g., while the intermediary is requesting the object from the server.

The intermediary may employ client-side pre-fetch which allows the WPO to send a fragment or segment of an HTML page (e.g., the "head") as quickly as possible in response to a request. This can accelerate the loading process by allowing a corresponding browser to start the downloading and rendering process in parallel to the server-side processing of the web page request. Once the object from the server is returned responsive to the request, the intermediary may compare the returned object to the delivered partial object from its cache. The intermediary may find any differences based on the comparison, and may deliver the differences to the client. In conjunction with or in between delivery of the partial object and differences, the intermediary may provide the client with client-side processing instructions or injected code. The client (e.g., a browser of the client) may execute the code or instructions while loading or rendering fragments of the web page.

Figure 2B:
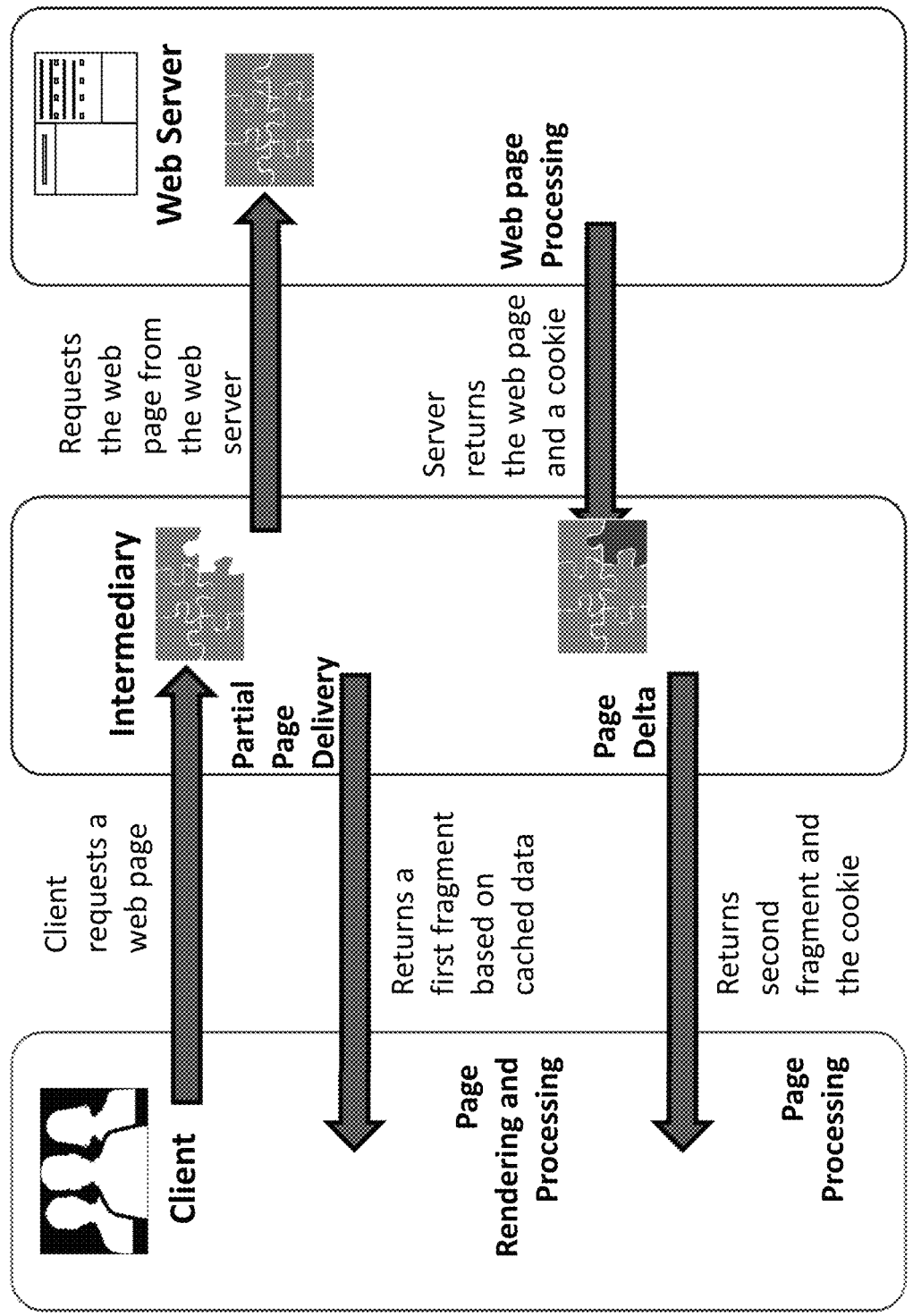
FIGS. 2B and 2C are flow diagrams depicting embodiments of process steps in a method for dynamically modifying a requested web page from a server for presentation at a client.
Figure 2C:
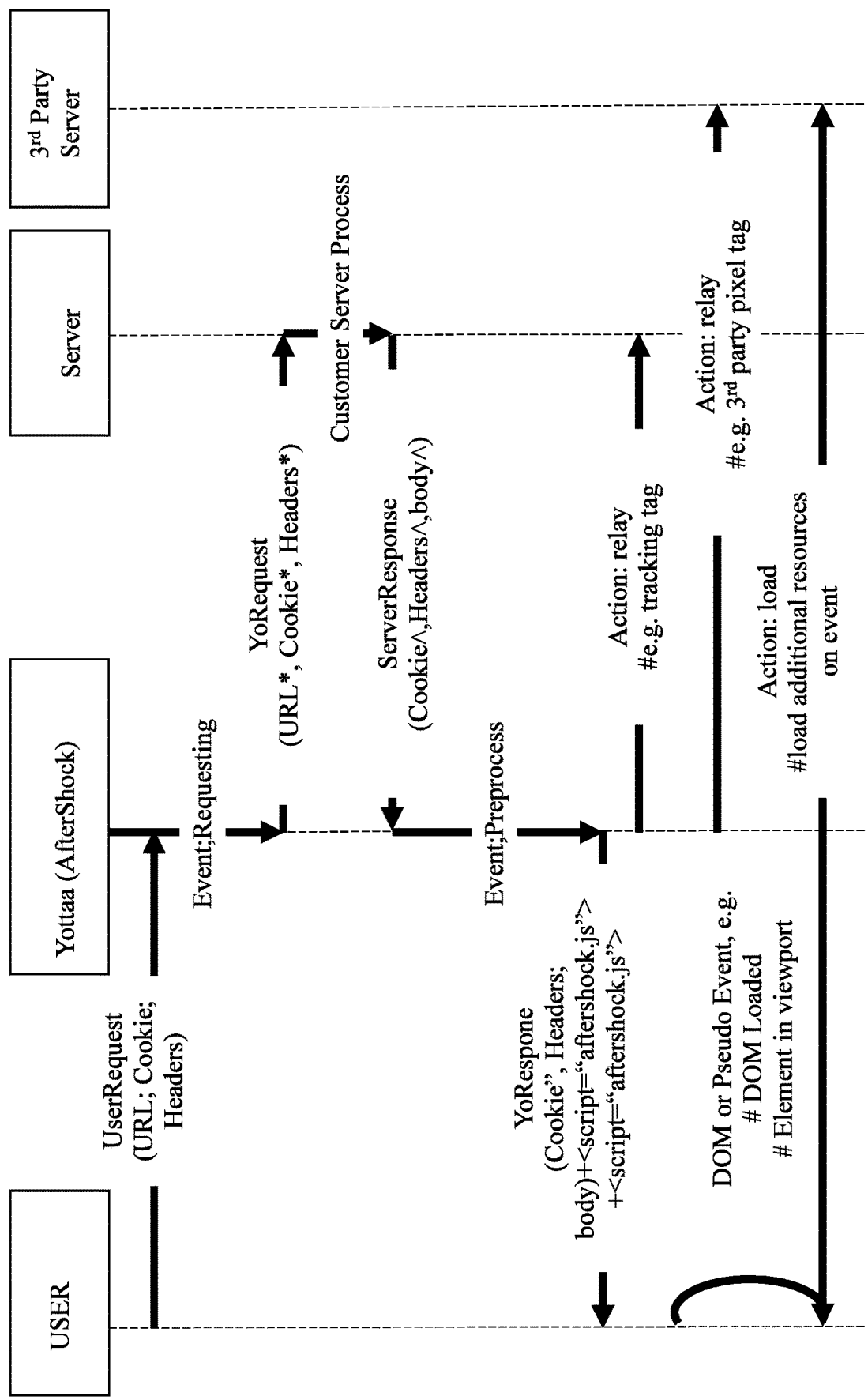

By way of example, embodiments of a method for dynamically modifying a web page are depicted in FIGS. 2B and 2C. Referring to these figures, a prior request for a web page from a server may involve the following illustrative HTML source file:

---
Original Source File

```
<html>
  <head>
    <link href="//www.foo.com/style.css" rel="stylesheet"
    type="text/css"></link>
    <script src="//www.foo.com/jquery.js"></script>
    <script src="//www.foo.com/app.js"></script>
  </head>
  <body>
    <!--ADDITIONAL/OPTIONAL MATERIAL -->
  </body>
</html>
```
---

Some portions of the web page may be cached by the intermediary. Once the page is in cache, and in response to a subsequent request for the web page, the WPO system may respond immediately with a HTML fragment, for example up to the "<body>" tag from the cached copy (e.g., as shown in FIG. 2B):

---
Initial Part/Fragment Returned To The Client

```
<html>
  <head>
    <link href="//www.foo.com/style.css" rel="stylesheet"
    type="text/css"></link>
    <script src="//www.foo.com/jquery.js"></script>
    <script src="//www.foo.com/app.js"></script>
  </head>
```
---

The TPU may inject or incorporate code into the initial fragment delivered to the client. In the embodiment depicted in FIG. 2C, an initial first fragment is not shown. In parallel, the Traffic Processing Unit (TPU) of the WPO system may convey the request for the webpage to the server. When the TPU receives a response back from the server, the TPU may extract a difference or delta from the web page, relative to the static portion in the initial fragment, to form a second fragment. The difference or delta may include one or more dynamic portions of the requested web page. The TPU may add code, e.g., which may include a "<script>" block that can set any cookie that the server responded with using a Set-Cookie header, to the response or second fragment:

If the code is added directly to the response received from the server, the TPU may, in this case, remove content that has already been sent to the client (e.g., the initially returned part/fragment). The TPU may send the remainder of the content (and the injected code) to the client, for example:

| The Remaining Response |
| --- |
| `<body>`<br>  `<!-- ADDITIONAL/OPTIONAL MATERIAL, e.g., dynamic portions of the web page, injected code -->`<br>  `</body>`<br>`</html>` |

Web pages may be made up of many different web resources that vary in their content-type and purpose. Each web resource may be stored and requested individually on a web server. This web page structure can make deployment of web pages and websites easy. However, the issue with this deployment model is that the web browser may need to request each of the web resources individually. The web browser may request one web resource and then process it to see if other web resources are needed. If more resources are required, the browser may request them one at a time and then it will repeat the process. Today's websites typically require many web resources to create the interactivity and presentation envisioned by their designers. Ajax, Web 2.0, and Collaboration websites all lead to an increase in the interactivity and design required to acquire and keep customers. Developers may design and implement web pages by breaking up the page into images, JavaScript, CSS, HTML, media (Flash, Sound, Video) and other resources. Developers do this in a way that makes it quick to build, debug, deploy, test, and maintain. This web page development process usually results in resources being broken down into specific tasks including, JavaScript files that implements a specific set of tasks, CSS files that manage the presentation of a certain section, component or element of a page, and images that display one graphical element of a page. However, browsers may be able to open only a limited number of connections to the web server. For instance, if the browser can only create two connections with a web server, resource requests may queue up until a previous resource is completely downloaded.

Typically, the loading of the assets/resources may not happen until the end, after the last byte of a web page. This can waste significant amounts of waiting time, impairing user experience. The WPO can deliver the initial fragment with injected code so that the browser can start to immediately begin the parallelization process of downloading the required assets. For example, the WPO may add JavaScript to the end of the first delivered fragment or HTML section (e.g., into a head section) to load resources or images, instead of waiting for the HTML that include the images. Even certain resources referenced in the page body may be moved into the <head> tag. For a certain web page, the "head" or static portion(s) may be identified by a user via the UI of the intermediary. The WPO may re-order code/scripts that are loaded at the end of the web page file to the beginning. If the browser can begin loading assets, for example, within 100 ms or less from the request, there can be significant page speed increases.

The WPO may incorporate code into a web page fragment that can intelligently modify an aspect of the originally-requested web page. For example, upon execution, the code may direct specific images (e.g., of a social plugin) from a website to load if and/or when these images are viewable to visitor. For example, images that are hidden in a background, cached, or configured to be invisible, may be identified and excluded/delayed by the code from loading and slowing down the page load. Based on specific requirements, a user may configure the code to manage images relative to a viewport. A viewport in a browser tab is the viewable area of a page. For example, a user may configure the code such that when a page on a website is loaded in a visitor's browser tab, all images within viewport may be loaded immediately. A user may configure the code to manage images such that only those images viewable to a visitor when the visitor scrolls on the page, may be loaded when in viewport.

In some embodiments, the WPO may incorporate code to load all or certain social plug-in scripts on a web page when the corresponding document object model (DOM) structure (e.g., HTML source) is ready. The WPO may recognize social plug-ins by their signature string. For example, a Facebook script tag may have a source attribute value: "//connect.facebook.net/en_US/all.js#xfbml=1". In some embodiments, the WPO may incorporate code to load images in a web page slideshow when a visitor performs an action, e.g., clicks a *next* button. The WPO may identify such elements in a web page, for example, an image is a slideshow may have a CSS class "slide-img" and the next button may have a CSS class "slide-btn-next".

In another illustrative example, a web page may place a quoted tweet in the top half of a web page, but locate a related Tweeter script tag at the bottom of the page. The WPO may incorporate code to advance or execute the script tag so that the tweet may be fully functional when loaded. The WPO may incorporate code to configure a social plugin script tag to load when the corresponding social plugin is viewable.

Figure 2D:
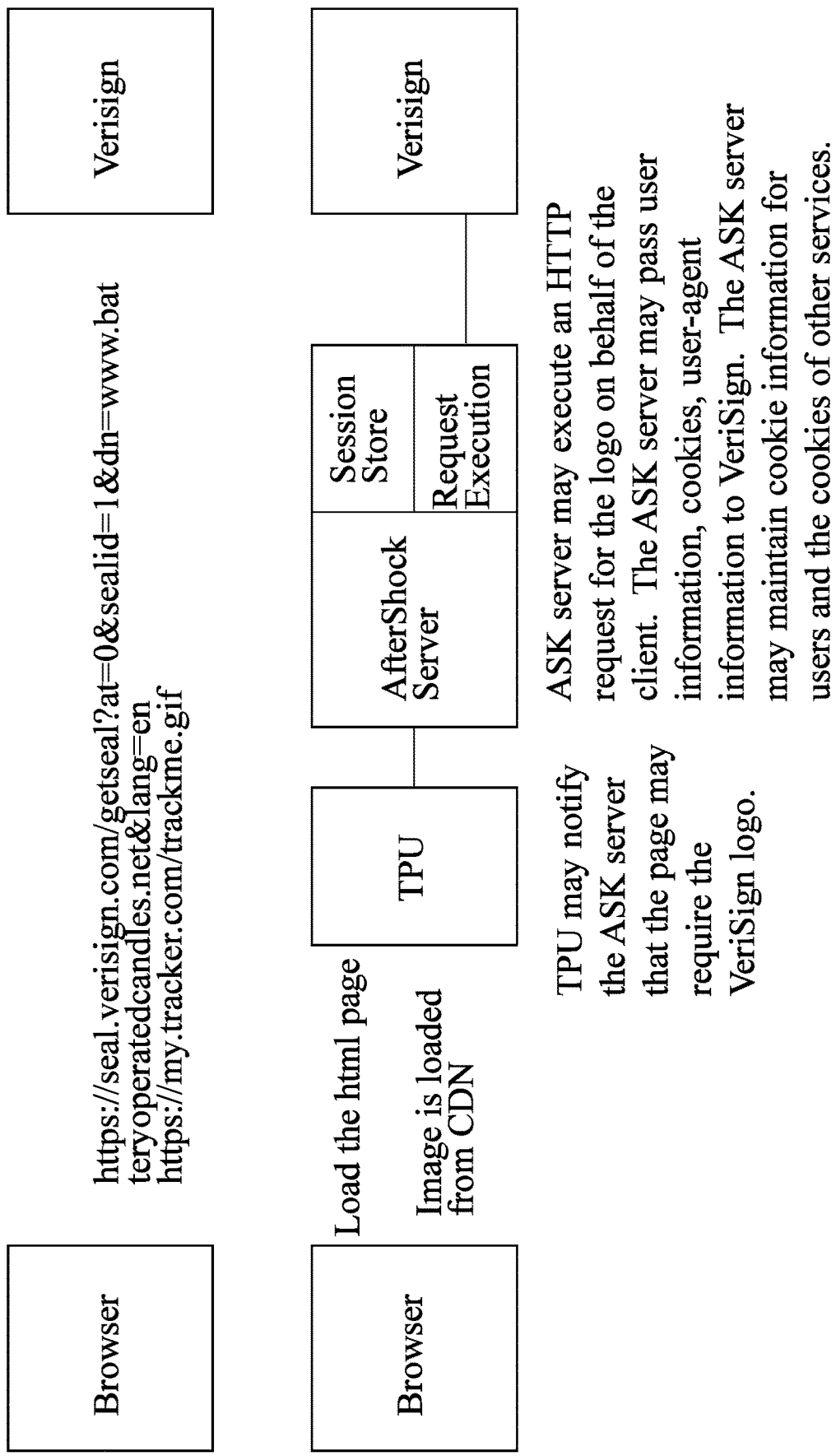
FIG. 2D comprises flow diagrams of embodiments of methods for handling a widget in a browser with and without a web performance optimization (WPO) system.

Web pages may include one or more widgets, such as pixel tags, beacons, social media plugins, images, analytics trackers or agents, media files, and trust shields or badges. Examples of such widgets include: a VeriSign logo, Google analytics agents, Hubspot plugins, and Marketo agents. When WPO detects a widget from a web page, the WPO may direct a request for JavaScript and/or images associated with the widget, to the WPO or TPU's optimizer for handling. Referring to FIG. 2D, a manner by which a widget may be handled by a browser in the absence of the WPO system, as well as via the WPO system, is depicted.

In some embodiments, the WPO may incorporate code into the modified web page to handle the various types of widgets or plug-ins, including third party widgets (e.g., from Facebook, Twitter and Pinterest). Categories of third party widgets include at least the following: (i) Widgets for Facebook, Twitter, Pinterest, Google+, Add this, etc.; (ii) Badges, logos or trust shields, for example, from VeriSign; (iii) Ads, for example, resulting from Google ad words; and (iv) Beacons or agents, for example, from Google Analytics, Marketo, etc. In some embodiments, the WPO may handle ads in a way that is simpler than the handling of widgets, e.g., allow ads to be delay loaded.

The WPO may allow for customization of a configuration of the code, e.g., by a user via the UI. For example, the WPO may allow a user to select or identify specific widgets for targeted processing or handling. The WPO may allow the user to specify when the widget should be injected or loaded onto the page (e.g., disable, X milliseconds after an onLoad event). The WPO may allow a user to change or replace existing widget injection instructions, e.g., change <script src=" "> and inline <iframe> into asynchronous injected widgets. The WPO may allow a user to specify a location within the page into which an <iframe> tag may be injected.

In certain embodiments, the WPO may control the injection of widgets via a JavaScript (JS). The WPO may check or verify if such a script is already injected and if not, add, move, replace or otherwise modify the script into the head node or section. The added/modified script can then handle the injection and/or display of the widget.

In some embodiments, widgets may be injected via an iframe. The WPO or a user may identify (e.g., locate and indicate) the position of the iframe, for example, via the UI. The WPO may include a library to listen for changes to the DOM and implement the client-side functionality. The library may be Javascript-based, and can be used to manage the scripts and iframes discussed above. In some embodiments, widgets may be loaded in external JS files, and loaded within a sandbox. These widgets may be ignored, or handled differently or similarly to that described above. For example, the widget injection code may be modified to be inline, or the code may be injected into that JS file to affect widget handling within that JS file.

In some web pages, deferring scripts may be incorporated and used to defer or delay an action, for example. Such scripts may be suboptimal and may delay page loading and/or consume system resources. In some embodiments, a blocking script may be replaced with similar asynchronous code as discussed above to delay the loading of a resource. With regards to handling of images, the WPO may handle these with HTML inclusion of image tags.

The WPO may use injected code to delay the loading of specific images. Using delay loading may be useful, for example, on blogs and product listing pages, web pages that include many images. To handle images, the WPO may have to perform image selection. This may involve finding and identifying the right images (e.g., to delay load), selecting multiple images, and controlling an appropriate number of images to select. The WPO may in some cases, use URL matching techniques to select images. The WPO may perform image selection using a standard, custom or proprietary query language. The WPO may perform selection of images based on one or more criteria, including DOM position, e.g., identifying a child of a certain element, since in some cases, an image may not have a style or other selectable attributes. For example, and referring to FIG. 2E, an image identified in the highlighted portion may have to be selected from within a web page.

In some embodiments, all elements located after a certain position in a web page may be selected for code-based processing. For example, in a product listing page, it may be desirable to delay the loading of images residing in a secondary, or less important portion of a web page.

In some embodiments, the injected code may control the transitioning characteristics of an image being displayed or appearing on a web page. For example, the code may perform fade-in or fade-out of an image. The image may fade-in or gradually transition to visible state, e.g., when a user scrolls into a portion of the page at which the image is located. This can make the appearance/disappearance of an image less jarring. The code can, alternatively, direct an image to snap on or off screen without a gradual transition.

The WPO may identify and handle existing scripts or script tags in a requested web page. Script tags can block the loading of an application and can cause long delays in page load. The WPO may handle scripts or script tags by code injection into the delivered, modified web page. For such tags, the WPO may process these using ASK to provide the corresponding code for injection. A script loader of the ASK client (e.g., yo_scriptLoader) may perform the actual loading of the script based a configuration. In some embodiments, the WPO may detect the insertion of a script tag into the DOM using a client library. The WPO may use the library to manage or perform code/JS injection into the modified page.

The WPO may identify and handle existing iframe tags in a requested web page. Iframe tags may block the loading of an application and can cause long delays in page load. The WPO may handle iframe tags by code injection into the delivered, modified web page. For such tags, the WPO may process these using ASK to provide the corresponding code for injection. An iframe loader of the ASK client (e.g., yo_iframeLoader) may perform the actual loading of the iframe based a configuration. The WPO may handle at least two types of iframe injection.

In some embodiments, the WPO may detect the insertion of a iframe tag into the DOM using the AfterShocK client library. The WPO may use the library to manage or perform code/JS injection into the modified page. The WPO may generate HTML fragments or injected code to handle waiting images. For iframes and images, the WPO may allow customization of an image displayed while the component has not been loaded. By default, an image (img) may use a transparent 1 pixel gif.

The WPO may allow customization of such default content for images. For example, the WPO may allow customization to provide a specific URL, so that user of the WPO system may add a wait cursor via the URL to the modified page, for example. The URL may allow a data URI incorporation of data, inline to a web page. The WPO may allow customization to provide an optimized version for each encountered image in the requested page. For example, if a user is requesting for a web page from a mobile device, the WPO may provide for an extremely compressed image that is no larger than 2 kb in size, for example.

In some embodiments, the WPO may provide the code for injection. The WPO may store or maintain a base code, which may comprise a configuration for configuring or specifying the injected code. The injected code may comprise the ASK client code. In some embodiments, injected code received by a number of clients for a plurality of web pages may be the same or substantially the same. For example, a full or minimized version of the ASK client code may be accessed from a database (e.g., of the intermediary), or from an online repository (e.g., via a URL), for incorporation into a web page fragment.

The WPO may provide a different configuration to each client and/or for each web page, for example, to configure the injected code to behave or operate differently between two clients and/or two web pages. In some embodiments, a configuration specific to a client and/or web page may be used to configure, specify or otherwise generate a piece of code at the intermediary for injection into a particular fragment. In other words, the injected code may be unique to a client (or user) and/or a web page.

By way of illustration, one embodiment of a base code or configuration is depicted below:

```
{
    "_id": "51d32ddf63e31e2d9000074f",
    "name": "AfterShock",
    "enabled": true,
    "last_modified": "2013-07-02T19:45:57Z",
    "token": "6",
    "_type": "Platform::DocumentRule",
    "match": [
        {
            "_id": "51bb222a86305e35e90000f6",
            "name": "URI",
```

-continued

```
            "type": "0",
            "operator": "CONTAIN",
            "condition": "/"
        }
    ],
    "actions": {
        "_id": "51d32ddf63e31e2d90000750",
        "htmlInsert": [
            {
                "_id": "51d32ddf63e31e2d90000751",
                "enabled": true,
                "filters": [ ],
                "content": "<script>//Fill in with the latest aftershock client code.</script>"
            }
        ],
        "transformer": [
            {
            }
            {
                "enabled": true,
                "comment": true,
                "merger": true,
                "item": [
                    //See the Tag Handler Section
                ]
            }
        ],
        "asyncJs": [ ],
        "prefetch": [ ],
        "cssCombination": [ ],
        "jsCombination": [ ],
        "cssSprite": [ ],
        "urlRewrite": [ ],
        "dataURI": [ ],
        "badAssetRemoval": [ ],
        "responsiveImage": [ ],
        "clientPrefetch": [ ],
        "cssInline": [ ],
        "jsInline": [ ]
    }
}
```

A user, such as an administrator or a representative of a website, may specify or customize a configuration for a web page via a UI and/or API of the intermediary. In certain embodiments, the injected code may include one or more tag handlers. A handler may be executed or used to remove or replace a particular script tag, process a widget, process a delay, etc FIGS. 2F, 2G and 2H depict embodiments of a user interface (UI) to configure the intermediary for dynamically modifying a web page from a server for presentation at a client. The user interface may comprise an application or a web-based interface, which may be accessible via the intermediary either remotely, or locally at a component of the intermediary. The user interface may allow a user to customize a configuration for a web page or web site. The configuration may be used to configure code already injected into HTML fragments transmitted to the client, or to configure code for injection into the fragments prior to transmission.

In some embodiments, the UI may provide access to an option for WPO to discover any tags within a requested web page. WPO may automatically recognize or identify different types of tags (e.g., iframe, image, script, video, object) via known signatures (e.g., URL patterns, DOM position). The user may access a list of configured actions on identified tags, with a status and an identification of tag-type for each tag, for example as shown in FIG. 2F. By way of illustration, injected code may be configured to modify a default rendering characteristic of a tag, e.g., make an iframe tag load on-demand. Certain tags may be left un-optimized, e.g., without any configured action, or without any change to its default rendering characteristic(s). In some embodiments, a user may identify a tag to configure an action via injected code. The user may specify, via the UI, to identify a tag through a match or partial match with a string or URL, for example, as shown in FIG. 2G.

The user may direct the WPO to optimize the tag, e.g., based on the tag type and/or a priori knowledge about the tag. The user may manually configure one or more actions. By way of example, and as shown in FIG. 2H, a user may select available options for performing an optimization action, e.g., removal of tag, on-demand loading of the tag, cloud processing of the tag, conditional removal of the tag, or deferred loading of the tag. For on-demand loading, a tag may be configured to be loaded responsive to detection of a trigger, e.g., if an identified DOM element that matches a certain string is visible and/or is accompanied with an event. For example, the event may include a user event such as a mouse-over, mouse movement, or a click. With regards to deferred loading, the injected code can be configured to defer loading of an element/fragment by a customizable delay, which may be determined from the time of the web page request, or a certain time period after a document on-load event.

Figure 2I:
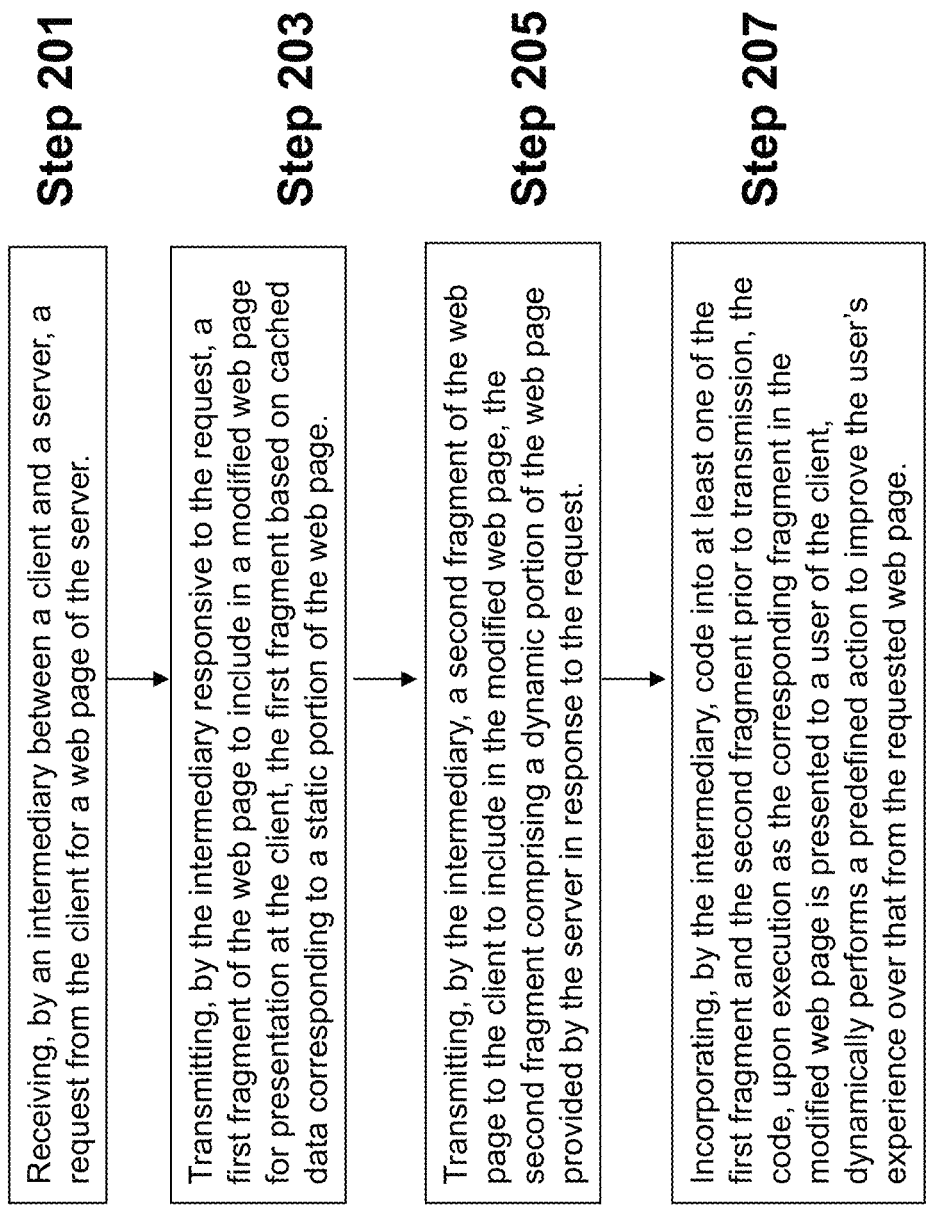
FIG. 2I is a flow diagram of an embodiment of a method for dynamically modifying a requested web page from a server for presentation at a client.

Referring now to FIG. 2I, one embodiment of a method for dynamically modifying a requested web page from a server for presentation at a client is depicted. The method may include receiving, by an intermediary between a client and a server, a request from the client for a web page of the server (201). The intermediary may transmit, responsive to the request, a first fragment of the web page to include in a modified web page for presentation at the client (203). The first fragment may be based on cached data corresponding to a static portion of the web page. The intermediary may transmit a second fragment of the web page to the client to include in the modified web page (205). The second fragment may include a dynamic portion of the web page provided by the server in response to the request. The intermediary may incorporate code into at least one of the first fragment and the second fragment prior to transmission (207). The code may, upon execution as the corresponding fragment in the modified web page is presented to a user of the client, dynamically perform a predefined action to improve the user's experience over that from the requested web page.

Referring now to (201), and in some embodiments, an intermediary between a client and a server receives a request from the client for a web page of the server. A browser of the client may generate the request based on a user action, such as a click on a link or an advertisement. The intermediary may intercept the request from the client. The intermediary may receive or intercept the request, comprising a HTTP or HTTPS request, from the client. In some embodiments, the client may be configured to transmit the request to the server via the intermediary. The intermediary may receive or intercept the request as a cloud service. The intermediary may process the request as a service or feature of an appliance, router, proxy device or any other network device or system. A TMS of the intermediary may receive and route the request to a TPS, embodiments of which were described above in connection with at least FIGS. 2A and 2B. The TPS may reside in the intermediary or comprise a network device or cloud service. The TPS may receive and process the request, for example, prior to requesting the server for the web page.

Referring now to (203), and in some embodiments, the intermediary may transmit, responsive to the request, a first fragment of the web page to include in a modified web page for presentation at the client. The intermediary may transmit the first fragment of the web page to for processing, assembly, loading, rendering, execution and/or presentation at the client, e.g., on a browser of the client. The first fragment may be based on cached data corresponding to a static portion of the web page. The TPS may access a cache of web page data corresponding to the requested web page. The cache may store or maintain web page data received from one or more servers, including the requested server and/or a mirror site of the requested server. The cache may store one or more components of a web page that may be static, e.g., a header section of the page.

The static portion may comprise elements of the page that do not change between multiple requests, requesting clients, geographical locations of the clients, browsers and/or users, or that do not change over a certain period of time. The static portion may be identified, determined, detected and/or inferred by the TPS over one or more requests for the web page. The static portion may be manually configured or identified by a user or administrator. In some embodiments, the static portion is identified via a comparison between a cached copy of the web page and a later copy provided by the server. The TPS may immediately transmit a first fragment of the page to the client, comprising the static portion of the page, for loading on a browser. Due to the availability of this fragment within a short period of time from the request, a user of the client experiences a more responsive and faster page load in association with the requested web page.

In some embodiments, the intermediary may transmit or convey the request for the web page to the server. The TPS may convey, direct, route or re-transmit the request to the server in parallel with the processing of the request at the intermediary. The TPS may send the request to the server during, before or after processing the request at the intermediary. In some embodiments, the TPS may modify the request, or generate a new request for the web page or for a portion of the web page. Responsive to the request, the server may generate a response comprising a web page, including a dynamic portion of the web page. The dynamic portion may, for example, be specific to the user, the client, the browser, geographical location and/or the time of the request. The server may send the web page and/or a cookie in one or more responses to the request. The server may send the one or more responses to the client or the intermediary, e.g., as each response becomes ready to send.

The intermediary may receive the requested web page from the server responsive to the request, the web page comprising at least the dynamic portion. The intermediary may receive a cookie from the server responsive to the request. The intermediary may receive or intercept the response on behalf of the client (e.g., via Cname or DNS redirection). The intermediary may identify and/or extract the dynamic portion from the response. The intermediary may identify and/or extract a difference or delta from the web page relative to the portion already returned to the client. In some embodiments, the TPS generates or forms a second fragment of the web page based on the difference/delta or the dynamic portion of the web page. The intermediary may form the second fragment as soon as, or responsive to receiving the response from the server.

Referring now to (205), and in some embodiments, the intermediary may transmit another fragment (e.g., a second fragment) of the web page to the client to include in the modified web page. This fragment may include a dynamic portion of the web page provided by the server in response to the request. The TPS may transmit the second fragment to the client as soon as the second fragment is generated. The intermediary may send or convey the cookie from the server to the client. The intermediary may incorporate code (e.g., Javascript, VBScript, ActionScript, a plug-in implemented in a language such as C, C++, a script referencing a browser plug-in, or a script referencing a native module) in the second fragment to set (e.g., maintain, update and/or identify) the cookie at the client for use in a further communication with the server.

In some embodiments, the intermediary may incorporate code in a different fragment (e.g., a third fragment) to set the cookie at the client for use in a further communication with the server. This fragment may be transmitted prior to, responsive to, concurrent with, during or after the transmission of the second fragment to the client. In some embodiments, the third fragment does not include or convey a dynamic portion and/or a static portion of the web page. The intermediary may transmit the corresponding cookie with the third fragment, or transmit the corresponding cookie in a message separate from the third fragment.

Referring now to (207), and in some embodiments, the intermediary may incorporate code into at least one of the fragments (e.g., the first, second and/or third fragments) prior to transmission to the client. The code may be implemented with an appropriate programming or scripting language, such as Javascript, VBScript, ActionScript, a plug-in implemented in a language such as C, C++, a script referencing a browser plug-in, or a script referencing a native module. The intermediary may incorporate or inject a particular type, set and/or collection of code depending on which fragment to which the code is being injected. The intermediary may incorporate a particular type, set and/or collection of code depending on at least one of: data cached in connection with the requested web page, a feature or characteristic of the web page, the requesting user, a characteristic of the client and/or client browser (e.g., client/browser type, geographical location, language preference, etc.), any injected code already delivered to the client via a prior fragment, and a configuration of the intermediary and/or server pertaining to code injection. The intermediary may inject or incorporate code to replace or modify existing code or features in the requested web page. For example, and in some embodiments, the intermediary may disable, modify and/or replace existing deferring or blocking scripts with Javascript code, as discussed above in connection with at least FIGS. 2A and 2B. The intermediary may incorporate or inject the code inline in a message (e.g., HTTP message), or in a separate script file referenced or attached to the message.

The code may, upon execution while the corresponding fragment in the modified web page is presented to a user of the client, dynamically perform a predefined action to improve the user's experience over that from the requested web page. The code may run, execute or be otherwise activated when the corresponding fragment is loaded or processed at a browser or other application of the client. The browser or client application may execute or run the code by loading the fragment. The browser or client application may execute or run the code as the fragment is loaded. At least a portion of the code may remain active or continue to run after the fragment is loaded. For example, the code may, continuously or for a period of time, poll, monitor or detect an action by the user, in the background. A portion of the code may execute after a configured delay, or be triggered by a page load event, browser event, DOM event and/or user action.

The intermediary may incorporate code in a multipurpose internet mail extensions (MIME) multipart message. The code may be injected into a HTTP message. The intermediary may transmit the one or more fragments in a MIME multipart message (e.g., one or more of the subtypes of a multipart message). The intermediary may transmit the one or more fragments via any type of HTTP message. The intermediary may incorporate code in a MIME multipart message to set the cookie at the client for use in a further communication with the server. The intermediary may transmit the first fragment, the second fragment and/or the third fragment via MIME multipart messages to include in the modified web page. The intermediary may transmit one or more of the fragments for assembly and/or processing at the client.

The intermediary may incorporate code based on a configuration of the intermediary. As discussed, the configured may be based on the client device type, browser type, the user, the geographical location, etc. The intermediary may incorporate code customizable via a user interface and/or an API. A representative of the server or website, or an administrator, may customize the configuration based on knowledge of the web page, e.g., obtained via analysis of past traffic. The code may be configured to dynamically perform a predefined action, e.g., using a default and/or customized configuration provided by the intermediary and/or a user. The code may be injected, added or incorporated to operate at the client, e.g., in the background, without the user of the client realizing that the code is present or running. The code may be injected, added or incorporated to operate at the client, without requiring a change or modification at the server, e.g., to generate the web page. The code may be injected, added or incorporated to execute at the client without affecting how the requested web page is generated and transmitted. The code may be incorporated into the one or more transmitted fragments, to modify or alter a feature or characteristic of the requested web page. The code may be incorporated into the one or more transmitted fragments forming a modified version of the requested web page.

In some embodiments, the intermediary incorporates code that directs or requests the client's browser to perform a certain action. The intermediary may incorporate code that directs the client's browser to request for web page data corresponding to the client's device or browser type. For example, the intermediary and/or the injected code may detect that the client comprises a mobile device, or includes a browser with limited capabilities (e.g., lack of support for Flash). By way of an illustrative embodiment, the code may detect the client's device or browser type, or a capability thereof, via a client-agent attribute. The client-agent attribute may be configured in the client or included in the request. The code may direct the browser to request for web page data, of the identified web page, corresponding to the client's device or browser type. For example, the injected code may request for a portion of the web page data (for the requested web page) appropriate for the device/browser, e.g., that can be rendered on the device/browser.

In certain embodiments, the intermediary may incorporate code that directs the client's browser to request for another web page corresponding to the client's device or browser type. As described earlier, the intermediary and/or injected code may detect that the client comprises a mobile device, a large form-factor screen, or a browser with specific capabilities and/or limitations. Based on the detection, the code may be configured to direct or redirect the browser to request for a different web page, e.g., from the same web server or a different web server. For example and in some embodiments, the code may direct the browser to request a different web page optimized for a mobile device, a large-screen device or a touch-screen device. The code may direct the browser to request a web page optimized for an operating system of the device (e.g., iOS, Android, Windows, etc.) The code may direct the browser to request a web page optimized for a particular browser, e.g., Internet Explorer, Safari, Chrome browser, Firefox, etc. Thus, the injected code can improve or optimize a user's experience by customizing web page content or source based on device/browser attributes.

The intermediary may incorporate code that affects an aspect of any one or more resources for the modified web page. By way of illustration, and not intended to be limiting in any way, a resource may include one or more of: hypertext markup language (HTML) content or object, an image, a cascading style sheet (CSS), a widget, a social media plug-in, an analytics agent, a pixel tag, a beacon, a trust seal or badge, a media file, a script and an advertisement.

The intermediary may incorporate code that adds or modifies a configuration for including advertising in the modified web page. The code may detect if advertising is already provided for in the requested web page. The code may remove advertising, e.g., to improve page load time, or to exclude advertising material that is not relevant to the user. The code may modify an existing configuration, e.g., changing an aspect ratio, size, shape, position, animation (e.g., transition effects in presenting an ad or switching ads) of an ad. The code may control timing or delaying of an ad relative to other elements of the page, or in response to a user event or a page load event. In certain embodiments, the code may include an ad by creating a configuration for the ad, or modifying an existing configuration. In this way, the code may be used to incorporate customized content that may be from a third party. The intermediary and/or the injected code may also facilitate impression matching and/or perform brokering with third parties like ad exchanges, ad networks and ad agencies. Accordingly, the code may improve user experience by (i) providing access to relevant and/or customized content, goods and services via intelligent injection/modification of ads, (ii) removing or limiting irrelevant ads, and/or (iii) affecting the presentation of ads based on device/browser attributes and/or particular events.

The intermediary may incorporate code that directs the client's browser to pre-fetch a resource to store in a local cache. The injected code may direct or request the browser to fetch or access a resource (e.g., image), in anticipation that the resource may be needed shortly. Suitable resources for pre-fetch may include certain large images and widgets, a related web page, or resources originating from a server/database with a slower response. By performing the pre-fetch in advance or in parallel with other page processing activities, the user's experience may be improved with the enhanced performance in loading the web page.

The intermediary may incorporate code that incorporates a third-party widget or content into the modified web page. The injected code may be configured to include content relevant to a user or the requested web page, without reconfiguring the server or how it generates its web page. Widgets from partners, such as third party analytics, may be added to a web page so that a user's online activity (e.g., specific to that web page or across pages) may be tracked and/or analyzed to improve customization of content and/or advertising relevant to the user.

The intermediary may incorporate code that controls a location of a resource in the modified web page. The injected code may identify and detect particular resources that are less relevant or which may take longer to load. The injected code may identify and detect particular resources that are more relevant or may be faster to load. The injected code may control the layout of content and other resources by modifying a location of a resource in the web page.

The intermediary may incorporate code that controls a time instant for loading a resource to the modified web page. The injected code may initiate pre-fetching or caching of the resource to control the time instant for loading a resource. The code may delay or time the loading of a resource, e.g., relative to the request for the web page, or relative to a DOM, user or page load event. The code may replace or modify an existing deferring or blocking script. The injected code may comprise an asynchronous loading code. The latter may speed up page loads by allowing asynchronous execution.

In some embodiments, the intermediary incorporates code that determines a loading sequence for a plurality of resources. The injected code can determine a time instance and/or a position for loading a resource relative to another resource or to other resources.

The intermediary may incorporate code that controls a time instant for making a resource visible or not visible to the user. The injected code may control the time instant(s) and/or duration of a resource's visibility, transparency or alpha-blending with other elements, when loaded on a web page. The injected code may control the time and duration of transitioning effects (e.g., fade-in, fade-out) in making a resource visible or not visible to a user.

Different portions or combinations of code may be injected based on existing features, and customizable based on particular requirements. Different portions or combinations of code may be injected on-the-fly to one or more fragments, while a request for a web page is processed. On-the-page processing occurs as the individual fragments are loaded onto a browser. Accordingly, the present systems and method provide a platform for dynamically modifying aspects of a requested web page that improve user experience.

Figure 2J:
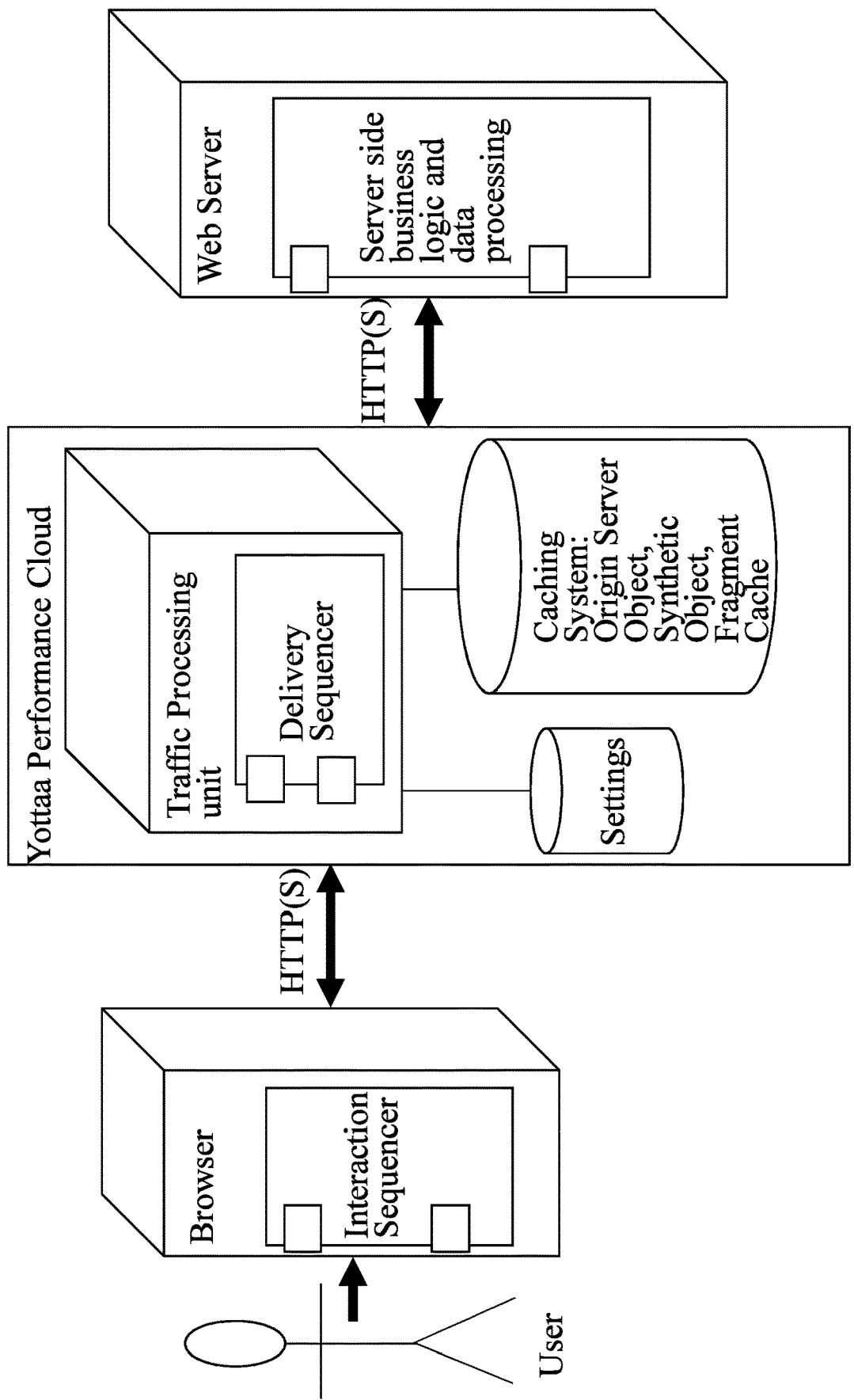
FIG. 2J is a block diagram of an embodiment of a system for dynamically managing loading priority or sequencing of fragments of a web object.

C. Dynamically Managing Loading Priority or Sequencing of Fragments of a Web Object In some aspects, the present disclosure is directed to methods and systems for dynamically managing delivery and/or loading priority of fragments of a web object, sometimes referred to as application sequencing. In some embodiments, application sequencing refers to a process for orchestrating or managing delivery, as well as client side processing (loading or rendering, which may include download to client and browser loading) of web objects. This process may include re-arrangement of a sequence of items in a requested web object. Application sequencing may include defining fragments each comprising at least a portion of an item, for delivery to a requesting client over a plurality of transmissions. Application sequencing may include a modification of default rendering characteristics of items in a requested web object. The application sequencing process may include re-prioritizing how each item of a requested web object may be delivered and rendered in order to improve the web and mobile user experience. The application sequencing process may include setting conditions/triggers for delivery and rendering of each item of a requested web object in order to improve the web and mobile user experience. Application sequencing, in some embodiments, includes one or both of Delivery sequencing and Interaction sequencing Referring to FIG. 2J, one embodiment of a system for delivering an item of web content requested by a client is depicted. In brief overview, the system may include at least one intermediary between at least one client and at least one server (e.g., web server). Application sequencing, by the system, may be performed using at least one of the following components: a delivery sequencer in the intermediary, and an interaction sequencer operating on the requesting client. The delivery sequencer and interaction sequencer may each comprise a combination of hardware and software, or software executing on hardware (e.g., of the intermediary or client).

The at least one intermediary may include a plurality of network devices, which may include one or more of a server, an appliance, a gateway, a router, a proxy and a domain name service, as examples. The intermediary may comprise embodiments of modules and/or features described above in connection with at least FIGS. 2A-2D. The intermediary may comprise a cloud-based platform and may provide cloud-based services such as web object optimization, delivery optimization and user experience improvements. The intermediary may sometimes be referred to as Yottaa performance cloud.

In some embodiments, the intermediary may include a TPU, a configuration or set of settings, and/or a caching system. The caching system may include and/or manage a cache for storing fragments or items of a web object. For example, the caching system may access a local cache, a remote central storage module, or a storage area network (SAN). The caching system may be configured to track the validity of a stored fragment or item, and may assign or de-allocate memory to an item/fragment based on a static or dynamic behavior of the item/fragment. In some embodiments, the caching system may assign or de-allocate memory to an item/fragment based on a configuration or setting of the intermediary. The configuration or setting(s) may be user-defined and/or set by the intermediary based on prior traffic, and may include any embodiment of the configuration 240 described above in connection with at least FIG. 2A. For example, the intermediary may include or have access to a configuration provided by a representative of the web server. The intermediary may include or have access to a default configuration or set of settings. The intermediary may include a user interface for a privileged person to configure the configuration or settings.

The TPU may include embodiments of TPUs and/or features described above in connection with at least FIGS. 2A-2D. The TPU may include a delivery sequencing engine/module, sometimes referred to as a delivery sequencer. The delivery sequencing engine/module may comprise a combination of hardware and software, or may comprise software executing on hardware (e.g., a processor) of the TPU or intermediary. In some embodiments, the delivery sequencing engine/module or TPU may define a plurality of fragments for a requested item of web content, and may determine to transmit the plurality of fragments to the requestor over a plurality of transmissions. The delivery sequencing engine/module or TPU may order the plurality of fragments in a specific sequence, and may deliver or transmit the fragments according to the sequence. The delivery sequencing engine/module or TPU may define and/or order the fragments based on cached items managed by the caching system for example. The delivery sequencing engine/module or TPU may define and/or order the fragments based on the configuration or settings.

Delivery Sequencing may involve one or more of: breaking a monolithic web content unit into smaller units (fragments), re-prioritizing the order of (and/or setting conditions for) delivery of these fragments, setting caching policy for each fragment, determining delivery timing for each fragment, and delivering such fragments following the re-prioritized order and delivery timing. The web content unit can be any web content object, such as an HTML document, an image, a CSS file, a Javascript file, a video file, an audio file, or an Adobe Flash or SWF file. Delivery sequencing may be performed at the intermediary by the delivery sequencer.

In some embodiments, interaction sequencing describes a process for improving or optimizing rendering performance by controlling and streamlining an order of rendering of various elements on a web page, or different fragments of a web content item. The rendering of at least some of these elements may be conditional, e.g., based on triggering events. Rendering may include a process of requesting for, receiving, loading, executing and/or displaying an element on a web page, such as via a browser. Rendering may include a process of interpreting code or instructions, which may include HTML code, to load a portion or element of a web page on a browser. Rendering may include assembly and/or aggregation of components and/or resources into an item for loading, execution and/or display as part of a web page. Rendering may include a process of embedding, incorporating or merging an item, resource and/or fragment into a context/portion of a web page. A browser may perform rendering of an object, which may involve execution of a script or instructions associated with the object. A browser may perform rendering of an object by accessing a graphical processing unit of the client. In some embodiments, rendering includes a process of requesting a component item of an object (e.g., from a server), uploading the component item to the requesting client, loading the component item into memory of the client or a browser, and/or incorporating the component item into the object.

Typically, a browser may render elements in a web page in the order/sequence presented in the web page. For example, for HTML, rendering may start from the top of the page and proceed to the bottom of the page, until the entire page is rendered. Instead of following a normal standard rendering sequence for elements referenced in the web page, interaction sequencing based on the present systems and methods may re-prioritize and/or set condition(s) for the rendering of various components so that important, required and/or available ones are processed immediately while the others may be deferred or processed as needed. Interaction sequencing may be performed at the client by the interaction sequencer. The interaction sequencer may comprise code incorporated, injected or introduced by the intermediary into a portion of a web page that is loaded onto a browser. Injection/incorporation/introduction of executable code may comprise including or embedding the code, in part or in whole, into one or more fragments. Injection of executable code may comprise including a link, reference or locator in one or more fragments, so that the code may be accessible in part or in whole.

Interaction sequencing may include various triggers for processing rendering of a page element, for example, but not limited to:
1. Visibility based trigger: The trigger to render a page element may depend on whether the element is visible to the user (e.g., within a viewing region of a browser or client display).
2. Event based trigger: The trigger to render a page element may be based on a Document Object Model (DOM) event.
3. Timer based trigger: The trigger to render a page element may be based on a timer.

When the timer expires, the element can be rendered.

Interaction sequencing can be applied to all kinds of web content types, such as: HTML document, image, video, audio, Javascript, CSS, Flash SWF file, and so on. When the interaction sequencer detects such a trigger, it may initiate a "post-trigger" action for rendering of a corresponding element. In some embodiments, the interaction sequencer implements a pre-trigger action prior to detecting such a trigger. A pre-trigger action may comprise at least one of: withholding rendering of the element/fragment, displaying nothing (e.g., leaving a blank space or an empty object) at an identified location of the web page, and displaying at least one item. The at least one item may comprise at least one of: an indicator or message indicating that an item is loading, a temporary or placeholder item or image, an advertisement, and a special call-to-action item. A call-to-action item may include a widget, image or message for example that entices, motivates or suggests a user to take a particular action, e.g., click on the widget, or scroll the page.

There can be many types of application sequencing, including HTML sequencing. In some embodiments, HTML sequencing refers to a process for improving delivery and rendering of an HTML document, which may be cache-able or non-cache-able. The HTML document can be dynamically generated by a web server, and may include dynamic and/or personalized data unique to the current session, time instant/period/zone, user, device, browser, geographic location, etc. The intermediary may not cache such data when identified and/or received at the intermediary. HTML sequencing may include at least one of the following components:

Delivery sequencing, which may be performed by the Traffic Processing Unit (TPU), residing in an intermediary that intercepts HTTP requests and responses between a client and a web server. The TPU may perform one or more of the following: split or break an HTML document into smaller fragments, generate synthetic units based on these fragments, deliver the first unit to the client browser quickly for processing, and store other units for potential subsequent requests from the client. The TPU may also inject executable code (such as JavaScript) into the one of these units or fragments delivered to the browser. This executable code may be configured to perform interaction sequencing.

Interaction sequencing, which may be performed by the injected executable code, is sometimes referred to as "UxSequencer". UxSequencer may execute according to configuration data (e.g., from the intermediary), and may perform actions such as loading additional fragments for the page, determining whether, how and when to render specific fragments on the page, and/or specific HTML tags (including third party tags), and how to render resources on the page (such as images, video, objects, tables, etc.).

HTML sequencing can be applied to both dynamic web pages as well as static web pages. Dynamic web pages may comprise pages that are re-generated or updated by the web server often or at each request, and which may not be cached for direct re-use. Typically, this is because the page may contain (dynamic) personalized data that are unique to the current session, or data that may change dynamically. Static pages are those that may not change over a period of time (sometimes referred to as a Time to Live, TTL). A dynamic page may be assigned with a TTL of a low value (e.g., 1 minute) or zero. Static pages may be cached and thus may not need to be generated by the web server, e.g., until the cache or page expires (e.g., TTL becomes zero).

In one embodiment, HTML sequencing may be performed via one or more of the following steps:
1. A user may visit a web page via a browser (say, a page at http://www.mysite.com/path/loggedin.html).
2. The browser may send an HTTP request to http://www.mysite.com/path/loggedin.html.
3. An intermediary may intercept the HTTP request, and may route it to one of its Traffic Processing Units (TPU) to process the HTTP request.
4. The TPU may access its caching system to check if there are data and sequenced fragments available for this page.
5. If nothing is found from the cache (or what was found from the cache has expired, e.g., with TTL=0), then:
   (i) The TPU may forward the HTTP request to the origin web server for processing, and may wait for the web server to respond.
   (ii) Once the TPU receives the response from the origin web server, the TPU may retrieve the returned HTTP document from the HTTP response, may return it to the current visitor and may perform sequencing in the background.
   (iii) In the background, the TPU may use sequencing settings for this site and this page, and/or other behavioral data that may have been learned beforehand, to sequence this page into small chucks, and may rewrite these chunks into deliverable fragments.
   (iv) Rewriting: the TPU may package the chunks and may perform the necessary rewriting, such as:
      1. Injecting executable code into the fragment, and/or
      2. Remove a content block from the fragment and replace it with a unique identifier or marker (sometimes referred to as "fragment pointers").
   (v) The TPU may store some of these fragments into its caching system with the appropriate TTL settings for each one of them. Some fragments may have TTL value of a few hours to a few days for example, but some may have a TTL value of 0, meaning that such a fragment is dynamic and may be retrieved from the origin server's response to the HTTP request.
6. If cached fragments were found with a valid TTL, then the TPU may send back a first fragment to the requestor immediately;
   (i) If all fragments for this page have valid TTL (e.g., the page has no dynamic personalized content), the TPU may not need to forward the HTTP request to the origin web server.
   (ii) If at least one of the fragments is marked with TTL=0 (dynamic), the TPU may forward the HTTP request to the origin web server to retrieve a new copy of the HTML document.
      A. Once the new copy of HTML document is received, the TPU may go through the sequencing steps outlined in Step 5 above again, and may update the cached fragments appropriately.

The steps for delivery sequencing may be performed by the intermediary (e.g., the TPU). Once the first fragment arrives at the client side browser, interaction sequencing may be performed. Interaction sequencing may be performed by executable code injected into the fragment by the intermediary. The injected executable code (e.g., interaction sequencer) may use its configuration data to determine whether, when and how to render content (e.g., page elements) inside this fragment, and whether/when/how to initiate additional fragments onto the page based on page events:

If a page element is visible, interaction sequencer may render it (including loading the resources the element may require);
   The timing for rendering may be determined by the configuration data for interaction sequencer. Rendering can be immediate, deferred by a certain duration, deferred until certain resources are rendered, or deferred until everything (e.g., all required resources, or everything else) is rendered;
If the page element is not visible, interaction sequencer may initiate or sequence the element's rendering according to configuration data (e.g., modified/configured rendering behavior): deferred or on-demand as needed. The trigger for rendering can be page events such as user interactivity or other in-page activities. For example:
   The user scrolls the page
   The user clicks a button or link on the page
   A timer expires
   A change in a page element that fires a DOM event, etc.

When interaction sequencer is rendering an element, it may load additional resources required by the element. It may identify and/or use one or more fragment pointers to compose an HTTP request to the server to download additional fragment(s) for processing. The following includes a few examples to illustrate how application sequencing may be performed.

Example

Sequencing a Dynamic HTML Page

Consider a dynamic web page identified by URL "http://www.mysite.com/path/loggedin.html". This HTML source code for the page may look like:

| HTML Source Code for "loggedin.html" |
|---|
| <html> |
| <head> |
| ... |
| </head> |
| <body> |
| <div id="header" ...> |
| <img src="logo.png"> |
| <span>Welcome, CoachWei. Your last login was at 03:23:14am ET Mar 2 2013</span> |
| ... |
| </div> |
| <div id="block1" ...> |
| <H1>This is content block #1</H1> |
| ... |
| </div> |
| <div id="block2" ...> |
| <H2>This is a content block #2<H2> |
| ... |
| </div> |
| <table id="block3" ...> |
| <H2>This is content block #3</H2> |
| .... |
| </table> |
| </body> |
| </html> |

This page may contain many content blocks. Each content block can contain its own resources. In this example, content block "header" may be dynamically generated and may be personalized to the current logged in user. Other content blocks may be static and not personalized. In a typical process, the browser may send the request to the web server for page http://www.mysite.com/path/loggedin.html. The Web server may receive such HTTP request, find the session information and the user information, perform server side business logic processing and may also perform the necessary data lookups and queries. Eventually, the web server may generate the above HTML document, and send this document back to the browser. The browser may start to process this HTML document following the standard processing order (typically line-by-line or element-by-element, from the top to the bottom of the HTML document, including loading the necessary resources along the way). After all elements of this page have been processed and rendered, the page may be ready for user interaction.

When a page is displayed in the browser, a significant portion of content may be outside of the viewport or viewing region of the browser screen. The viewport may comprise a viewing region or area of the browser or client device, viewable by the user. Content outside the viewport may not be visible/displayed/viewable to the user. However, such content may still have to be loaded and rendered as part of the page, which can slow down the page load and impact user experience significantly.

In accordance with some embodiments of the present systems and methods, an intermediary may sequence this page according to sequencing configuration. The document may be broken into chucks and modified by injecting executable code and appropriate unique identifiers or markers, resulting in, for example, five fragments as shown below.

Fragment 1: executable code yo-app-sequencer.js may injected and its configuration settings may be injected as "yo-app-sequencer-config.js". Further, the content of this fragment may be chosen using visibility or viewport-based detection: content that are initially displayed above the fold in the viewport are incorporated into this fragment. Content blocks that are not visible (below the fold) may be stripped out as separate fragments with appropriate unique identifiers or markers (e.g., that includes URL strings) injected into this fragment:

---
Fragment 1:

```
<html>
<head>
...
<script type="text/javascript" src="//yo-app-
sequencer.js"/><script>
<script type="text/javascript" src="//yo-app-sequencer-
config.js"></script>
</head>
<body>
<div id="header" ...>
<img src="logo.png">
<span id="welcome-user"
yopath="http://www.mysite.com/path/loggedin.html/?yoloc-
id=welcome-user"></span>
  ...
</div>
<div id="block1"
yopath=""http://www.mysite.com/path/loggedin.html/?yoloc-
id=block1" .../>
<div id="block2"
yopath=""http://www.mysite.com/path/loggedin.html/?yoloc-
id=block2" .../>
<table id="block3"
yopath=""http://www.mysite.com/path/loggedin.html/?yoloc-
id=block3" .../>
</body>
</html>
```
---

Depending on the sequencing configuration, fragment 1 may be set a Time to Live from 0 to a few hours, a few days, etc. If the TTL is set to be larger than 0 and has not expired, the TPU can use the previously cached fragment 1 to respond to future requests for this page without having to wait for the origin server to generate a new page first, thus significantly reducing the waiting time and providing an instant on experience to the user. Once this fragment arrives at the browser, the browser can start rendering the page immediately.

---
Fragment 2:

```
<span id="welcome-user">Welcome, CoachWei. Your last login was
at 03:23:14am ET Mar 2 2013</span>
```
---

---
Fragment 3:

```
<div id="block1" ...>
<H1>This is content block #1</H1>
...
</div>
```
---

---
Fragment 4:

```
<div id="block2" ...>
<H2>This is a content block #2<H2>
...
</div>
```
---

---
Fragment 5:

```
<table id="block3" ...>
<H2>This is content block #3</H2>
....
</table>
```
---

In this example, fragment 1 may be selected by a visibility or view-port-based rule. It may be configured to be "static" with a TTL larger than 0, which means the previously cached copy can be used. It may be displayed immediately. Fragment #2 may be configured to be dynamic with a TTL=0. It may be retrieved from the origin server's response (HTML file). Fragment #3, #4 and #5 are all static, which means previously cached (and unexpired) copies can be used.

Once fragment 1 is processed and rendered by the browser, the interaction sequencer "yo-app-sequncer.js" may start to manage interactions according to its configuration data. The configuration data may for example specify to: (i) display fragment #2 as quickly as possible; (ii) display fragment #3, #4 and #5 if necessary (e.g., a post-trigger action in response to a trigger), such as when they are becoming visible when the user scrolls down the page (trigger).

When an HTTP request to this webpage is intercepted by a TPU, the TPU may forward the request to the origin web server. However, it may look for a cached copy of fragment #1 for this web page. If it finds such a cached copy, it may return the cached copy to the client immediately, and may not wait for the origin server to respond to the initial HTTP request. Once this fragment arrives at the browser, the browser can start rendering the page immediately, providing a responsive user experience. Once the origin server returns an HTTP response, the HTML document from the response may be used to reconstruct all fragments, and may replace previously cached copies with an updated TTL policy for each fragment for future usage.

Upon rendering of fragment #1, interaction sequencer yo-app-sequencer.js may immediately scan the page for unique identifiers or markers, and process them according to the configuration. For example, it may find the marker for fragment #2. Because fragment #2 may be configured to be displayed as soon as possible, it may immediately fire an HTTP request in the background to the server to retrieve fragment #2. This request may be constructed using the unique identifier or marker discovered, which may be: yopath=http://www.mysite.com/path/loggedin.html/?yoloc-id=welcome-user When this request is intercepted by the intermediary, the processing TPU may access a cache to check for fragment #2 according to the information provided by the unique identifier or marker. If the TPU finds fragment #2 in cache and the corresponding TTL is valid, the cached copy may be sent back to the client. If not, the TPU may wait for the origin server to respond to the initial HTTP request to retrieve the web page. Once the response is returned/received, the TPU may extract the corresponding segment from the response webpage as fragment #2, and return this to the client. The client side executable code may take the returned response and replace the HTML element with the returned DOM element. As a result, the user may for example see a personalized welcome message and his last login date and time displayed/updated in the browser, based on the returned DOM element.

In some embodiments, interaction sequencer yo-app-sequencer.js may not do anything proactively for other fragment unique identifiers or markers detected or discovered on the page, because the corresponding fragments may be configured to be loaded as needed. If the user does not scroll the page, these fragments may not need to be loaded, thereby saving significant bandwidth and/or avoiding unnecessary processing on these fragments. In some embodiments, the interaction sequencer may perform a limited or predefined amount of processing in connection with other fragment unique identifiers or markers (e.g., for unique identifiers or markers nearer or proximate to the corresponding viewport), in anticipation of a scrolling action or other trigger, for example.

By way of illustration, responsive to the user scrolling the page, or to some other event occurs that causes a fragment to become visible, the interaction sequencer may use the unique identifier or marker to construct an HTTP request. The interaction sequencer may send or direct this request to the server to retrieve the corresponding fragment. Although the request may be addressed or directed to the server, the TPU may intercept and/or process the request. The HTTP request may be intended for the TPU, and may be generated such that the TPU recognizes the appropriate processing and/or response for the request. In some embodiments, the server may not understand the request and may not be able to directly handle the request. The TPU may go through a similar process to locate the requested fragment (e.g., from cache or from a response sent by the server) and return it to the client. In some embodiments, the TPU may wait for a response from the server, and may generate a fragment requested by the HTML request, based on the response. In certain embodiments, the TPU may request for or retrieve resources for the requested fragment (e.g., from the server, a cache, a third-party service, or a different network device/location). The TPU may generate and/or return the requested fragment, responsive to the request. The client side interaction sequencer may replace a placeholder object and/or a unique identifier in the page with the returned HTML fragment, or otherwise render the fragment.

A loading icon, loading message or loading status indicator may be injected into the placeholder (or as the placeholder) for each fragment. While the fragment is being loaded, the user can see the loading indicator as a visual feedback, thus improving the overall user experience.

In some embodiments of the present systems, there may be two types of configuration, a server-side configuration and a client side configuration. To configure the system, changes may be made to the server-side configuration. The client-side configuration may be generated or updated for each page after being processed by the server. Manually typing a client-side configuration in a page may be helpful for debugging purpose, and valuable if the server-side implementation changes. By way of illustration, one embodiment of a server-side configuration is depicted as follows:

```
var yo_config = {
    rules: [
        {act:"tracking"},
        {act:"load", selector:"#clickimg", on:{evt:"click",
    selector:"#allsizes-photo"}, processed:true},
        {act:"load", selector:"img", on:{evt:"viewable"}},
        {act:"load", selector:"iframe", on:{evt:"viewable"}},
        // {act:"load", selector:"#testimg", fadein:false},
        {act:"pauseXHR", on:{evt:"begin"}},
        {act:"resumeXHR", on:{evt:"complete"}}
    ],
    proxy_host: "http://localhost:8080/"
    // proxy_host:"http://www.vwvortex.com/"
};
```

This configuration may, in certain embodiments, comprise a JavaScript file that has an object named yo_config. The rules property of the configuration may hold a list of actions. Every action, during execution, can obtain its configured rule via a pass-in context object. By default, all actions may listen for a preprocess event.

By way of illustration, one embodiment of a Client-side configuration is depicted as follows:

```
yo.client_config=
{"events":[
    {"evt":"click","selector":"#allsizes-photo","refs":[1],"actids":[0],"evtid":0,"emid":0},
    {"evt":"viewable","refs":[2,3,4,5,6],"actids":[1],"evtid":1,"emid":1},
    {"evt":"viewable","refs":[ ],"actids":[2],"evtid":2,"emid":2},
    {"evt":"begin","actids":[3],"evtid":3,"emid":3},
    {"evt":"complete","actids":[4],"evtid":4,"emid":4}],
"actions":{
    "0":{"act":"load","selector":"#clickimg","processed":true,"store":{"refs":[0]},"actid":0},
    "1":{"act":"load","selector":"img","store":{ },"actid":1},
    "2":{"act":"load","selector":"iframe","store":{ },"actid":2
},
    "3":{"act":"pauseXHR","store":{ },"actid":3},
    "4":{"act":"resumeXHR","store":{ },"actid":4}},
"elements":[
    {"src":"http://farm8.staticflickr.com/7341/9300157912_f47df0a759_b.jpg"},
    { },
    {"src":"http://farm9.staticflickr.com/8550/9029806996_04befa585d_b.jpg"},
    {"src":"https://pbs.twimg.com/media/A7EiDWcCYAAZT1D.jpg"},
    {"src":"http://www.ccs.neu.edu/home/liang/img/header.jpg"}
,
    {"src":"http://imgs.xkcd.com/comics/ice_sheets.png"},
    {"src":"http://imgs.xkcd.com/comics/council_of_300.png"}]}
```

In certain embodiments, a client side configuration may be generated after a server-side preprocess event. The client side configuration may be designed for context storage across a client/server boundary, and may be used to provide settings for client side events. As shown in the example, there may be three properties in a client-side configuration. These may include events to convey to the client script (e.g., interaction sequencer) registering events, actions, which can be invoked when event fired, and elements, which may be used to store processed element information. The configuration may be bounded to yo.client config that is at the global scope accessible by some or every script in the page. All actions, events and elements may use an unique id for referencing (e.g., within a configuration).

Cookie Management:

In some embodiments, cookie management may involve resource processing in the cloud, such as handling a pixel tag or sending requests. In some embodiments of the system, there may be two kinds of cookies, a managed cookie and a third party cookie. A managed cookie may include a cookie from a customer (e.g., server). As the name suggests, a customer's traffic may be managed by the system, hence the system may manage such cookies from the customer. On the contrary, a third party cookie may be transparent to the system. Browsers and third party sites can keep these third party cookies. The system can follow the same protocols of handling a third party cookie (e.g., in a latest version of the Firefox browser), in that it may not send and update a cookie for third party sites, also known as "Block third-party cookies and site data" (in Chrome for example).

For cloud relaying purposes, some embodiments of the system may introduce two cookies to track a user browser and maintain a similar semantic as today's browsers. The first cookie may be referred to as BID. BID may comprise an identifier of user's browser. Its expiration time may be one year (e.g., to save tracking database size, a small number may be deployed) and can update every time the browser visits a managed site (a customer site, e.g. www.PCM.com). The second cookie may comprise a session cookie (e.g., no expires property), SID. SID may be related to BID in that SID may (only) serve as a signal of browser session restart. When the system detects that a user has restarted the browser, all session cookies from managed sites may be trashed. The BID and SID may not be forwarded to the managed site.

Certain embodiments of the system may include an action sometimes referred to as tracking that implements this idea. When the tracking action is enabled, it can maintain BID and SID cookies, and may add isNewBrowser and isNewSession, two boolean flags to the processing context, so that actions executed after tracking may know or have access to a status of the current session, and can save data to the session or browser store, just like in a browser but on the server side.

D. Systems and Methods for Handling a Cookie from a Server by an Intermediary Between the Server and a Client Described herein are systems and methods for handling a cookie from a server by an intermediary between the server and a client. Certain embodiments of these systems and methods may be implemented in connection with the processing of a request for a web page by an intermediary, for example as described above in connection with FIGS. 2B-2D, 2I and 2J. The cookie may accompany or be incorporated into the requested web page. The present systems and methods can provide real time intervention via a cloud service or at an intermediary, upon receiving a client's request to a server for a web object. The intermediary may manage content and/or resources (e.g., including a cookie) delivered to the client while communicating with the server to process or fulfill the request.

A cookie may comprise a tag, pixel and/or tracking code/data. A cookie may sometimes be referred to as a HTTP cookie, a web cookie, or a browser cookie. A cookie may comprise a small piece of data sent from a website and stored in a user's web browser while the user is browsing that website. Each time the user accesses or loads the website, the browser may send the cookie back to the server to notify the website of the user's previous activity. A cookie may be built, designed and/or configured to be a mechanism for web servers to maintain, store or track stateful information (e.g., items in a shopping cart), or to record the user's browsing activity (e.g., clicks on particular buttons, logins, or pages visited by the user within some period of time).

The intermediary may identify or define a plurality of HTML fragments that can be assembled into a modified web page for the client, in response to the request, for example as described above in connection with FIGS. 2B-2D, 2I and 2J. The intermediary may provide a plurality of web object fragments that can be assembled into a web object to fulfill the request. Web objects can include an HTML page, a script (e.g., Javascript) file, an image, a video object, audio object, a flash file or small web format (SWF) file, or a CSS file, as examples. The intermediary may be configured to inject or incorporate code into a transmitted fragment. The transmitted fragment can include any portion of the requested web object's static or dynamic data, or any amount of information. The code may be executed by the browser (e.g., in the background) as the transmitted fragment is loaded or rendered as a portion of the modified web page. In some embodiments, the code may be configured to intelligently perform certain actions that modify the web page or affect some aspect of a resource of the web page, such as to provide cookie management for enhanced web-based interactions.

In some embodiments, the intermediary may transmit the request for the web page to the server, for example as described above in connection with FIGS. 2A and 2B. The intermediary may receive the requested web page from the server responsive to the request, the web page comprising at least the dynamic portion. The intermediary may receive a cookie from the server responsive to the request. The intermediary may send the cookie from the server to the client. In some embodiments, the intermediary may incorporate code in a second fragment to set the cookie at the client for use in a further communication with the server. For example, the intermediary may incorporate code in a multipurpose internet mail extensions (MIME) multipart message to set the cookie at the client for use in a further communication with the server. The intermediary may transmit the first fragment and the second fragment via MIME multipart messages to include in the modified web page. In some embodiments, the intermediary may incorporate the code based on a configuration of the intermediary. The intermediary may include the configuration for configuring the code. The intermediary may include a user interface for customizing or configuring the code being injected or incorporated.

Referring again to FIG. 2C, the intermediary (e.g., Yottaa/Aftershock TPU) may inject or incorporate code into an initial fragment delivered to the client. In the embodiment depicted in FIG. 2C, an initial first fragment is not shown. The intermediary may convey or forward the request for the web object to the server (e.g., in parallel with processing the initial fragment). When the intermediary receives a response (to the request) from the server, the intermediary may identify or extract a difference or delta from the web object, relative to the content sent in the initial fragment, to form at least a second fragment. The difference or delta may include one or more dynamic portions of the requested web page. The server may provide one or more cookies (e.g., with the response). The intermediary may add or incorporate the code to the response or a second fragment (e.g., YoResponse, as depicted in FIG. 2C). The code may comprise any type or form of instructions or script(s), for example, code expressed in at least one of: ECMAScript language or a language similar or related to the ECMAScript language, ActionScript language, visual basic language and hypertext markup language. The code may include a "<script>" block that can set the one or more cookies that the server provided, using one or more Set-Cookie headers.

By way of another example, and in the context of FIG. 2I for illustration, some embodiments of the intermediary may transmit another fragment (e.g., a second fragment) of the web page to the client to include in the modified web page (e.g., in step 205 of FIG. 2I). This fragment may include a portion of the web page provided by the server in response to the request. The intermediary may transmit the second fragment to the client as soon as the second fragment is generated. The intermediary may send or convey a cookie from the server to the client. The intermediary may incorporate the code (e.g., Javascript, VBScript, a plug-in implemented in a language such as C, C++, a script referencing a browser plug-in, or a script referencing a native module) in the second fragment. The incorporated code may be configured to set (e.g., maintain, update and/or identify) the cookie at the client for use in a further communication with the server.

In some embodiments, the intermediary may incorporate the code in a different fragment (e.g., a third fragment) to set the cookie at the client for use in a further communication with the server. This fragment may be transmitted prior to, responsive to, concurrent with, during or after the transmission of the first/second fragment to the client. The intermediary may transmit the corresponding cookie with the third fragment, or transmit the corresponding cookie in a message separate from the third fragment. Although the fragment injected with the code may comprise a fragment having dynamic data, this is merely by way of illustration.

For example, the code may be injected into a fragment of static data, e.g., obtained from a cache of the intermediary. The code may be injected into any fragment delivered during the application sequencing process, for example as described above in connection with at least FIG. 2J. In some embodiments, the intermediary may inject the code into a message with minimal content (e.g., into a header portion of an otherwise empty HTML message). In some embodiments, the second/third fragment does not include or convey a dynamic portion and/or a static portion of the web page. By way of an illustrative example, the following is one embodiment of code injected into a fragment that is sent to a client:

```
<script>
  //This code can be executed on a browser.
  function setCookie(name, value, expires, path){
    var exdate=new Date( );
    exdate.setDate(exdate.getDate( ) + exdays);
    var c_value=escape(value) + ((exdays==null) ?"" : "; expires="
    +exdate.toUTCString( ));
    document.cookie=c_name + "=" + c_value;
  }
  //Set each cookie the server responds with.
  setCookie("session", "12312312312123", new Date(2013, 12, 31), "");
</script>
```

In some embodiments, the code may be injected to the response from the server. The intermediary may modify or update the response prior to injecting the code. If the code is added to the response received from the server, the intermediary may remove content that has already been sent to the client (e.g., in one or more prior fragments). The intermediary may send some remainder of the content (and the injected code) to the client. For example, one embodiment of a fragment incorporating the injected code may include the following:

```
<body>
  <!-- ADDITIONAL/OPTIONAL MATERIAL, e.g., dynamic portions
  of the web page, injected code -->
</body>
</html>
```

By way of example, one embodiment of code injected to handle cookies for a site called www.mywebsite.com, is as follows:

```
<!-- COOKIES START-->
<script type="text/javascript">
document.cookie="frontend=hrv4ncnv6e7upn25c7eqq37ea6; Expires=Tue,
23-Jul-13 16:46:05 GMT;Path=/;Domain=www.mywebsite.com"</script>
<!-- COOKIES END-->
```

The above code may be injected into a HTML fragment sent to a browser of the client. The code may be injected at the beginning of the HTML fragment, or to any other suitable portion of the fragment. The injected code can set the cookie and/or convey the received cookie to the client despite the fragmentation of the requested web object into one or more separate fragments for delivery to the client. In some embodiments, the injected code is designed or configured to set the cookie and/or convey the received cookie to the client without altering the cookie (e.g., at the intermediary). Multiple cookies can be set and/or conveyed by the code. A plurality of cookies may accompany various resources obtained by the server to incorporate into the requested web object (in the response). The server may itself incorporate a plurality of cookies with the server's response to the requested web object. As such, the code may be configured in some embodiments to set and/or convey a plurality of cookies to the client.

The intermediary may incorporate the code in a multi-purpose internet mail extensions (MIME) multipart message. The code may be injected into any type of HTTP message. The intermediary may transmit the one or more fragments in a MIME multipart message (e.g., one or more of the subtypes of a multipart message). The intermediary may transmit the one or more fragments via any type of HTTP message. The intermediary may incorporate the code in a MIME multipart message to set the cookie at the client for use in a further communication with the server. The intermediary may transmit the first fragment, the second fragment and/or the third fragment via MIME multipart messages to include in the modified web page. The intermediary may transmit one or more of the fragments for assembly and/or processing at the client.

As described earlier, in some embodiments, the system may use a script-based (e.g., Javascript-based) mechanism to directly handle, process or convey one or more cookies. In some embodiments, such a mechanism may cause PCI (e.g., Payment Card Industry) scanners like McAfee service to report such cookie handling as a violation or issue, if the cookies are set by the origin server as HTTPOnly. Instead of using a script-based mechanism, some embodiments of the system may implement an indirect, HTTP based mechanism that addresses HTTPOnly cookies as well as other types. Embodiments of the latter systems and methods may use or employ code (e.g., Javascript) injected into a fragment of the web page, which (when executed at the client) issues a predefined request (e.g., a special image request) from the browser on the client side.

In some embodiments, the predefined request may be generated by the executing code and/or browser, and directed/addressed to the server. The intermediary may recognize and intercept the predefined request before the predefined request can reach the server. The intermediary may prevent the intercepted predefined request from reaching the server. This predefined request may be processed by the intermediary, to configure one or more session cookies by appending "set-cookie" header(s) received (or to be received) from the origin server. The intermediary can respond to the predefined request issued from the client, by delivering the cookie and/or cookie information to the client, e.g., without using Javascript manipulation that can trigger cookie handling violations or issues.

By way of illustration, consider a client request to a server, where the request may be made to a site, http://www.pcm.com/, for example. Cookies may for example be set via HTTP headers from the origin server as follows:

```
Set-Cookie:JSESSIONID=F3BD07F2AA41E91EEF31A87ED92BA736;
Path=/; HttpOnly
Set-Cookie:widgetti.pcmall.f5=
9B7C85EF8F694DBCAED84FC5C4632A23;
Expires=Thu, 22-Aug-2013 15:51:32 GMT; Path=/
Set-Cookie:Widgetti.PCM.ID=
C76CF3C3E98E4EAE9576E31041CA0E24;
Expires=Thu, 21-Aug-2014 15:51:32 GMT; Path=/
Set-
Cookie:TSb92003=
49b537e0a20ca2a0c07c1d7e6fe638bc158aeac40169d702
5214e20360ac0ec5acd21b432d6d800ba6a4433cde109e3476492fec; Path=/
```

In some of the embodiments discussed herein, the intermediary may perform Javascript manipulation by moving the cookie information into a <script> block within a fragment delivered to the client, for example as follows:

```
<!--PREFETCH COOKIES START -->
    <script type="text/javascript">
        document.cookie="JSESSIONID=
        F3BD07F2AA41E91EEF31A87ED9
    2BA736;Path=/"
        document.cookie="widgetti.pcmall.f5=619CC1842C4C4288AB
    0416E086266D23;Expires=Thu, 22-Aug-13 15:40:55 GMT;Path=/"
        document.cookie="Widgetti.PCM.ID=
        CBD8A44C82944197B6486
    75CA0AD370C;Expires=Thu, 21-Aug-14 15:40:55 GMT;Path=/"
        document.cookie="TSb92003=8f520094a3c438e1756ff38c0167
    7363718dc158783038da5214df8760ac0ec5e8fab8922d6d800bbb
    799aa8de109e3480c96caa;Path=/"
    </script>
<!--PREFETCH COOKIES END -->
```

In some other embodiments, the intermediary may incorporate code into a fragment delivered to the client, for example, adding a <script> block for making a predefined request (e.g., for a single pixel image):

```
<script>
yo_loader("http://www.pcm.com/yo_app_sequencer.gif?v=
AAV7bKWYRSL
y_0MzoGn7Hg&t=c1JgWF6fbju_Wwj8DS17aw&s=
ZjU0MjU3NWNiNjRkNDJiMTQ3Y2I0ODEyZjQ2ZWVmNGQK");
</script>
```

This predefined request or special image request can be identified by the intermediary based on URI and/or query parameters, for example. These query parameters may include tokens that the intermediary uses to identify this request as a special or predefined request for cookie handling purposes. These query parameters may include tokens that the intermediary uses to identify the session context of this request, and/or the time stamp for this request. The URI and/or query parameters may comprise information configured for the intermediary (e.g., identifiable and/or understood by the intermediary), which may not make much sense to the origin server. For example, the predefined request may include an request for an image or resource that does not exist on the intermediary and/or the origin server. However, the predefined request may include a URI or other identifier that the intermediary can map or relate to a cookie and/or origin server. When the intermediary receives this image request, it may first validate the request by inspecting the tokens, the time stamp, and/or the session context. If validation fails, a response (e.g., a 204 response) may be returned (e.g., to the client) without any set-cookie header. In some embodiments, the intermediary does not send a response if validation does not complete successfully.

Responsive to the image request and/or successful completion of validation, the intermediary may identify the one or more "set-cookie" headers that are received from the origin server. In some cases, the intermediary may wait for the receipt of one or more "set-cookie" headers from the origin server. The origin server may provide the "set-cookie" headers in response to an initial HTTP request from the client, while or after the intermediary sends an initial response (e.g., with static data) or web page fragment to the client. The intermediary may copy these headers into a HTTP response header section for this special request, and return the set-cookie headers (e.g., with an empty body or a single pixel image). With this implementation, the HTTPOnly option on session cookies may be maintained, and the system may still able to deliver a first byte/fragment of the page (e.g., with static data) before or while the origin server provides the set-cookie headers.

By way of example, cookies may be set (e.g., within a response to the predefined request) under one embodiment of this implementation as follows:

```
Set-Cookie:JSESSIONID=F3BD07F2AA41E91EEF31A87ED92BA736;
Path=/; HttpOnly
Set-Cookie:widgetti.pcmall.f5=
9B7C85EF8F694DBCAED84FC5C4632A23;
Expires=Thu, 22-Aug-2013 15:51:32 GMT; Path=/
Set-Cookie:Widgetti.PCM.ID=
C76CF3C3E98E4EAE9576E31041CA0E24;
Expires=Thu, 21-Aug-2014 15:51:32 GMT; Path=/
Set-
Cookie:TSb92003=
49b537e0a20ca2a0c07c1d7e6fe638bc158aeac40169d702
5214e20360ac0ec5acd21b432d6d800ba6a4433cde109e3476492fec; Path=/
```

The present disclosure is illustrative of embodiments of the methods and systems for cookie handling. References to "first" and "second" fragments are illustrative and merely serve to distinguish between these two fragments. Accordingly, in some embodiments, these two fragments may be any two fragments which may or may not be adjacent to each other, that are in the middle, near the beginning, or near the end of a sequence of fragments.

Figure 2K:
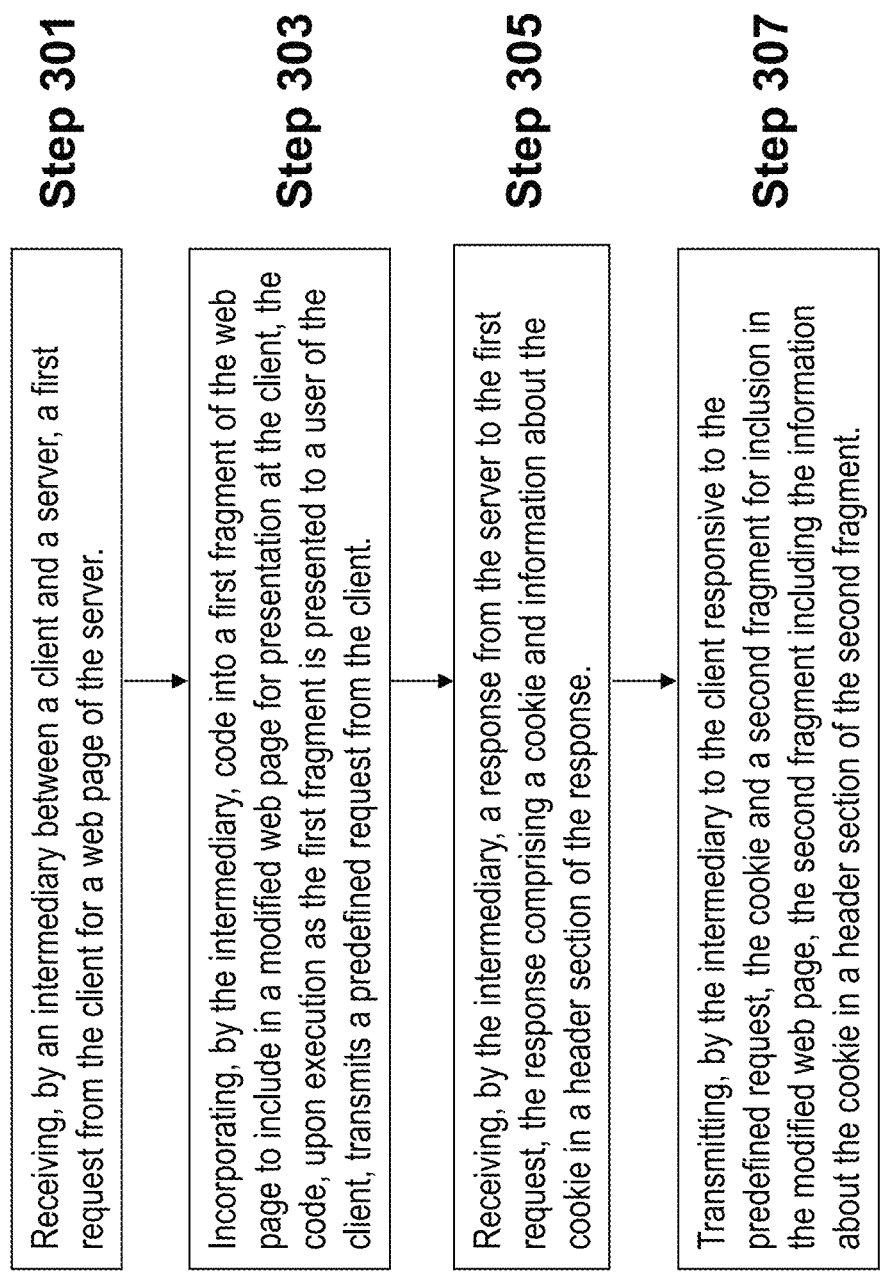
FIG. 2K depicts one embodiment of a method for handling a cookie from a server by an intermediary between the server and a client.

Referring now to FIG. 2K, one embodiment of a method for handling a cookie from a server by an intermediary between the server and a client, is depicted. The method may include receiving, by an intermediary between a client and a server, a first request from the client for a web page of the server (301). The intermediary may incorporate code into a first fragment of the web page to include in a modified web page for presentation at the client (303). The code, upon execution at the client as the first fragment is presented to a user of the client, may transmit a predefined request from the client. The intermediary may receive a response from the server to the first request (305). The response may include a cookie and information about the cookie in a header section of the response. The intermediary may transmit to the client responsive to the predefined request, the cookie and a second fragment for inclusion in the modified web page (307). The second fragment may include the information about the cookie in a header section of the second fragment.

In further details of (301), and in some embodiments, an intermediary between a client and a server may receive a first request from the client for a web page of the server. The intermediary may receive a request for any item of web content, for example a script (e.g., Javascript) file, an image, a video object, audio object, a flash file or small web format (SWF) file, or a CSS file, just to name a few. The intermediary may receive the request as described above in connection with FIGS. 2B-2D, 2I and 2J. The intermediary may intercept the request for processing at the intermediary. The intermediary may forward or send the received request to the server, for example as described above in connection with FIGS. 2A and 2B. In some embodiments, one or more cookies may be expected to accompany or be incorporated into the requested web object from the server. A cookie may include any tag, pixel and/or tracking code/data as described earlier.

In some embodiments, the intermediary may determine that the server provides a HttpOnly cookie. The intermediary may determine that the server is expected to provide or send one or more cookies configured or specified as HttpOnly. For example, the intermediary may determine that the server provides or is expected to provide a HttpOnly cookie based on a prior communication from the server. In certain cases, the intermediary may determine that the server provides or is expected to provide at least one non-HttpOnly cookie, such as a potential mixture of non-HttpOnly and HttpOnly cookies, or only non-HttpOnly cookies. In some cases or embodiments, the intermediary may utilize the script-based mechanism and/or a HTTP-based mechanism as described earlier, based on the determination. In certain embodiments, the intermediary may utilize the script-based mechanism or the HTTP-based mechanism, for example regardless of the type of cookies expected and/or without determining the type(s) of cookies expected from the server.

The intermediary may split the requested item of web content into a plurality of fragments, for example as described above in connection with FIGS. 2B-2D, 2I and 2J. The intermediary may define a plurality of fragments that can be assembled into a modified web page for the client, in response to the request. The intermediary may provide or generate one or more of the fragments based on content or information stored in a cache and/or received from the server.

In further details of (303), and in some embodiments, the intermediary may incorporate code into a first fragment of the item of web content (e.g., web page) to include in a modified web page for presentation at the client. The intermediary may incorporate code, e.g., Javascript, VBScript, a plug-in implemented in a language such as C, C++, a script referencing a browser plug-in, or a script referencing a native module, in the fragment. The incorporated code may be configured to facilitate setting, maintaining, updating and/or identification of a cookie for use by the client in a further communication with the server. The incorporated code may be configured to set, maintain, update and/or identify a cookie at the client for use in a further communication with the server. In some embodiments, incorporating code into a fragment may comprise including and/or instantiating code in the fragment, and/or including a pointer or link to the code which may be stored and/or accessed remotely. The item of web content may be modified to improve web performance and/or user experience. The intermediary may be configured to inject or incorporate code into the fragment, for example as described above in connection with FIGS. 2A and 2B.

The intermediary may incorporate the code in a multi-purpose internet mail extensions (MIME) multipart message. The intermediary may incorporate the code based on a configuration of the intermediary. The code may be injected into any type of HTTP message. The intermediary may transmit or communicated the one or more fragments in a MIME multipart message (e.g., one or more of the subtypes of a multipart message) to the client. The intermediary may transmit the one or more fragments via any type of HTTP message. The intermediary may incorporate the code in a MIME multipart message to set the cookie at the client for use in a further communication with the server. The intermediary may transmit the first fragment, the second fragment and/or the third fragment via MIME multipart messages to include in the modified web page. The intermediary may transmit one or more of the fragments for assembly and/or processing at the client.

The intermediary may inject the code at a beginning portion of the fragment (e.g., HTML fragment), or to any other suitable portion of the fragment. The injected code can set a cookie and/or convey a received cookie to the client despite the fragmentation of the requested web object into one or more separate fragments for delivery to the client. In some embodiments, the injected code is designed or configured to set the cookie and/or convey the received cookie to the client without altering the cookie (e.g., at the intermediary). The intermediary may convey and/or set one or more cookies from the server, responsive to or based on the injected code. A plurality of cookies may accompany various resources obtained by the server to incorporate into the requested web object (in the response). For example, the server may forward a cookie that accompanies a resource/identifier specified in the predefined request. The server may itself incorporate a plurality of cookies with the server's response to the requested web object. As such, the intermediary and/or injected code may be configured in some embodiments to set and/or convey a plurality of cookies to the client.

The intermediary may identify a fragment to incorporate the code, for example, a first, second or third fragment to be transmitted to the client. The intermediary may incorporate the code in an fragment comprising static and/or dynamic data. The intermediary may inject the code into any fragment delivered during an application sequencing process, for example, as described above in connection with at least FIG. 2J. In some embodiments, the intermediary may inject the code into a message with minimal content (e.g., into a header portion of an otherwise empty HTML message). The identified fragment can include any portion of the requested item of web content's static and/or dynamic data, and any amount of information. A browser of the client receiving the fragment may execute the incorporated code (e.g., in the background) as the corresponding fragment is loaded or rendered on the client. The browser and/or executing code may render the fragment as a portion of the modified web page.

In some embodiments, the intermediary may incorporate the code and/or send the corresponding fragment to the client prior to, in parallel with, or after receiving a response from the server to the request. A browser or other application of the client may receive the fragment, and may render the fragment on the client. The browser and/or client may execute the incorporated code based on the rendering. The browser and/or client may execute the incorporated code responsive to receiving and/or rendering the fragment. The code, upon execution as the fragment is presented to a user of the client, may transmit a predefined request from the client. For example, the browser may send an image request or any other message, based on the executing code. The code or browser may send the predefined request from the client to the server.

In certain embodiments, the intermediary may incorporate code that, upon execution, requests a predefined resource from the server. For example, the code, upon execution, may send a predefined request directed to the server for a predefined resource such as an image or a cookie. The intermediary may incorporate code that, upon execution, transmits a request that is received or intercepted by the intermediary. The code may be configured to send a predefined request intended to be intercepted and/or processed by the intermediary. The code may be configured to send a predefined request that identifies or describes an element that the intermediary can relate to, but which the server may not relate to. By way of illustration, the intermediary may recognize and intercept the predefined request before the predefined request can reach the server. The intermediary may prevent the intercepted predefined request from reaching the server. The intermediary may process the predefined request, to configure one or more session cookies by appending "set-cookie" header(s) received (or to be received) from the origin server. The intermediary can respond to the predefined request issued from the client, by delivering the cookie and/or cookie information to the client.

In further details of (305), and in some embodiments, the intermediary may receive a response from the server to the first request. The intermediary may receive the requested web page or item of web content from the server responsive to the request. The response may include a version of the requested item of web content, which may include dynamic and/or static information. The response may include a cookie and/or information about the cookie. For example, the response may include a cookie and/or information about the cookie in a header section of the response.

In some embodiments, the intermediary may incorporate code into a fragment delivered to the client, for example, adding a <script> block for making a predefined request. The intermediary may receive or intercept the predefined request from the client. The intermediary may associate the cookie from the server with the predefined request. The intermediary may associate the predefined request with the server's response comprising the cookie information. For example, the predefined request may include an identifier or identifying element (e.g., a token, URI or image identifier) that maps to, or is assigned to the server, the server's response, the cookie, the cookie information, and/or the corresponding communication session. The intermediary may parse the predefined request from the client for the identifier or identifying element, and may relate it to a particular cookie and/or cookie information. The intermediary may parse the predefined request for query parameter(s) to identify a session context of the request. For example, the intermediary and the injected code may share a predefined dictionary, look-up table, hash table or other means to relate the predefined request to cookie and/or cookie information to be received from the server, or already received from the server.

In further details of (307), and in some embodiments, the intermediary may transmit to the client responsive to the predefined request, the cookie and a second fragment for inclusion in the modified web page. The intermediary may send the cookie received from the server to the client. In some embodiments, the intermediary may include the cookie information into a <script> block within a fragment delivered to the client. In certain embodiments, the intermediary may incorporate code in a fragment to set the cookie at the client for use in a further communication with the server. The intermediary may incorporate code in a MIME multipart message to set the cookie at the client for use in a further communication with the server.

In some embodiments, the intermediary may transmit the cookie (e.g., with another fragment) to the client responsive to receiving a predefined request. The second fragment may include the information about the cookie in a header section of the fragment. In certain embodiments, responsive to receiving the predefined request, the intermediary may validate the predefined request. The intermediary may for example inspect the identifier(s), identifying elements or token(s), any related time stamp, and/or the session context of the predefined request. If validation fails, the intermediary may send a response (e.g., a 204 response) to the client without a cookie or cookie information. In some embodiments, the intermediary does not send a response if validation does not complete successfully.

Responsive to the predefined request and/or successful completion of validation, the intermediary may identify one or more "set-cookie" headers received from the server. In some cases, the intermediary may have to wait for the receipt of cookies and/or cookie information from the server. For example, the server may provide "set-cookie" headers in response to an initial HTTP request from the client. The intermediary may replicate, move or transfer these headers into a HTTP response header section for the predefined request, and return the set-cookie headers to the client. For example and in some embodiments, the intermediary may transmit one or more set-cookie headers to the client in another fragment. This fragment may for example comprise a body section that is empty or having a one-pixel image. In certain embodiments, this fragment may comprise a MIME multipart message.

It should be noted that certain passages of this disclosure can reference terms such as "first" and "second" in connection with fragments, requests, responses, etc., for purposes of identifying or differentiating one from another or from others. These terms are not intended to merely relate entities (e.g., a first message and a second message) temporally or according to a sequence, although in some cases, these entities can include such a relationship. Nor do these terms limit the number of possible entities (e.g., fragments) that can operate within a system or environment.

It should be understood that the systems described above may provide multiple ones of any or each of those components and these components may be provided on either a standalone machine or, in some embodiments, on multiple machines in a distributed system. In addition, the systems and methods described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, or in any byte code language such as JAVA. The software programs or executable instructions may be stored on or in one or more articles of manufacture as object code.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

We claim:

1. A method for handling a cookie from a server by an intermediary between the server and a client, comprising:
    (a) receiving, by an intermediary between a client and a server, a first request from the client for a web page of the server;
    (b) transmitting, by the intermediary the first request to the server;
    (c) incorporating, by the intermediary, code into a first fragment of the web page and transmitting the first fragment to the client to be included in a modified web page for presentation at the client, wherein the code, upon execution as the first fragment is presented to a user of the client, transmits a predefined request from the client;
    (d) receiving, by the intermediary, a response from the server to the first request, the response comprising a cookie and information about the cookie in a header section of the response;
    (e) receiving, by the intermediary, the predefined request from the client and determining, according to an identifying element in the predefined request that associates the predefined request to the cookie, that the predefined request is for prompting the intermediary to transmit to the client the cookie and the information about the cookie received in the response from the server; and
    (f) transmitting, by the intermediary to the client responsive to the determination, the cookie and a second fragment for inclusion in the modified web page, the second fragment including the information about the cookie in a header section of the second fragment.

2. The method of claim 1, comprising determining, by the intermediary, that the server provides a HttpOnly cookie.

3. The method of claim 1, comprising determining, by the intermediary, that the server provides a HttpOnly cookie based on a prior communication from the server.

4. The method of claim 1, wherein (b) comprises incorporating code that, upon execution, requests a predefined resource from the server.

5. The method of claim 1, further comprising associating, by the intermediary, the predefined request with the server's response comprising the information about the cookie.

6. The method of claim 1, wherein (f) comprises transmitting the second fragment, the second fragment comprising a multipurpose internet mail extensions (MIME) multipart message.

7. The method of claim 1, wherein (f) comprises transmitting the second fragment, the second fragment comprising a body section that is empty or having a one-pixel image.

8. A system for handling a cookie from a server by an intermediary between the server and a client, the system comprising:
    code configured for executing on a client to transmit a predefined request from the client; and
    an intermediary device, located between the client and a server, comprising:
    one or more processors with executable instructions configured for:
    receiving a first request from the client for a web page of the server;
    transmitting the first request to the server;
    incorporating the code into a first fragment of the web page and transmitting the first fragment to the client to be included in a modified web page for presentation at the client, wherein the code, upon execution as the first fragment is presented to a user of the client, transmits the predefined request;
    receiving a response from the server to the first request, the response comprising a cookie and information about the cookie in a header section of the response;
    receiving, by the intermediary, the predefined request from the client;
    determining, according to an identifying element in the predefined request that associates the predefined request to the cookie, that the predefined request is for prompting the intermediary to transmit to the client the cookie and the information about the cookie received in the response from the server; and
    transmitting to the client responsive to the determination, the cookie and a second fragment for inclusion in the modified web page, the second fragment including the information about the cookie in a header section of the second fragment.

9. The system of claim 8, wherein the intermediary device determines that the server provides a HttpOnly cookie.

10. The system of claim 8, wherein the intermediary device determines that the server provides a HttpOnly cookie based on a prior communication from the server.

11. The system of claim 8, wherein the intermediary device incorporates code that, upon execution, requests a predefined resource from the server.

12. The system of claim 8, wherein the intermediary device associates the predefined request with the server's response comprising the information about the cookie.

13. The system of claim 8, wherein the intermediary device transmits the second fragment, the second fragment comprising a multipurpose internet mail extensions (MIME) multipart message.

14. The system of claim 8, wherein the intermediary device transmits the second fragment, the second fragment comprising a body section that is empty or having a one-pixel image.

* * * * *